United States Patent
Nomura et al.

(10) Patent No.: US 6,922,612 B2
(45) Date of Patent: Jul. 26, 2005

(54) COMBUSTION VIBRATION ESTIMATING APPARATUS, PLANT AND GAS TURBINE PLANT

(75) Inventors: Masumi Nomura, Hyogo (JP); Katsunori Tanaka, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 319 days.

(21) Appl. No.: 10/057,955

(22) Filed: Jan. 29, 2002

(65) Prior Publication Data

US 2002/0103547 A1 Aug. 1, 2002

(30) Foreign Application Priority Data

Jan. 30, 2001 (JP) ........................................ 2001-022338

(51) Int. Cl.[7] ............................................... G05B 21/00
(52) U.S. Cl. ........................... 700/274; 700/30; 700/31; 700/32; 700/300; 700/301; 123/3; 123/192.1; 123/202; 123/429; 431/1; 431/18; 431/114
(58) Field of Search ........................... 700/30–32, 274, 700/299, 300, 301; 123/3, 192.1, 202, 429; 431/1, 18, 114

(56) References Cited

U.S. PATENT DOCUMENTS 5,445,517 A * 8/1995 Kondou et al. ............... 431/18
5,544,478 A  8/1996 Shu et al.

FOREIGN PATENT DOCUMENTS

| EP | 1229226 A2 | * | 7/2002 | ............ F02C/9/00 |
| JP | 408014550 A | * | 1/1996 | ............ F23N/5/08 |
| JP | 08210635 | | 8/1996 | |
| JP | 11-324725 | | 11/1999 | |
| JP | 2000130750 | | 5/2000 | |
| JP | 2002047945 A | * | 2/2002 | ............ F02C/7/00 |

* cited by examiner

*Primary Examiner*—Ramesh Patel
(74) *Attorney, Agent, or Firm*—Oblon, Spivak, McClelland, Maier & Neustadt, P.C.

(57) ABSTRACT

The combustion vibration estimating apparatus comprises an inputting unit for inputting limiting values of plant data, weather data and internal pressure variation, an internal pressure variation characteristic grasping unit for making internal pressure variation of a combustor into a mathematical model from the input plant data and weather data, a combustion vibration region estimating unit for applying a limiting value of the internal pressure variation to the mathematical model obtained by the internal pressure variation characteristic grasping unit to obtain combustion vibration-prone to be generated region, and an outputting unit for outputting a combustion vibration region estimation result by the combustion vibration region estimating unit.

39 Claims, 15 Drawing Sheets

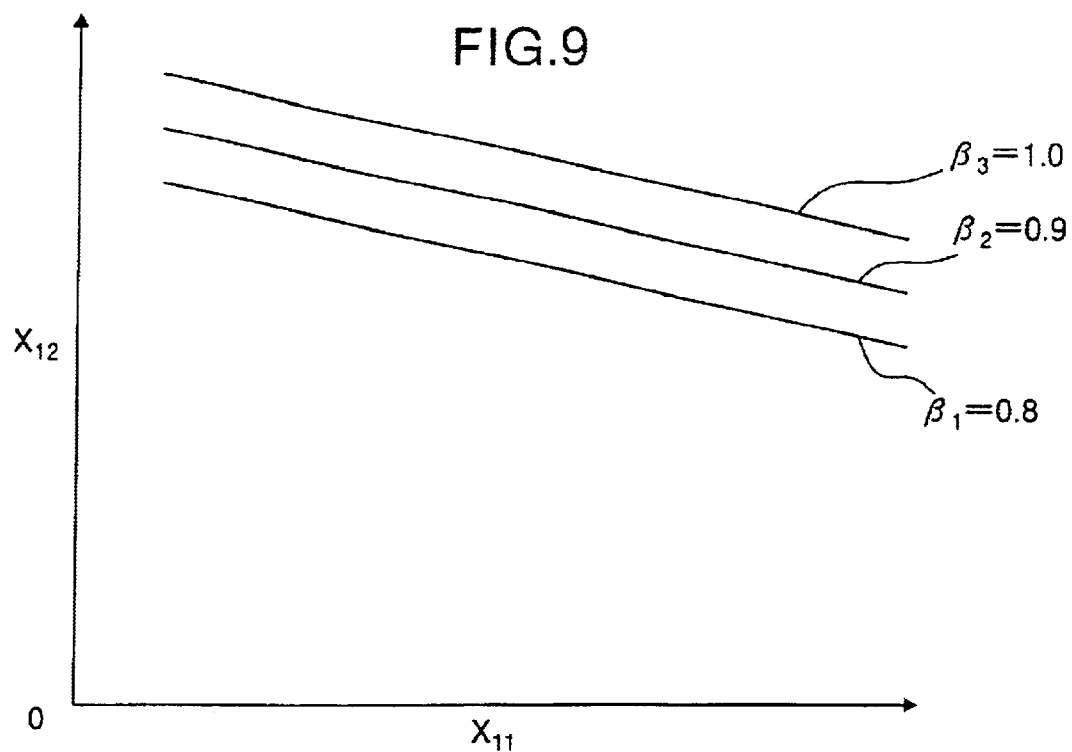
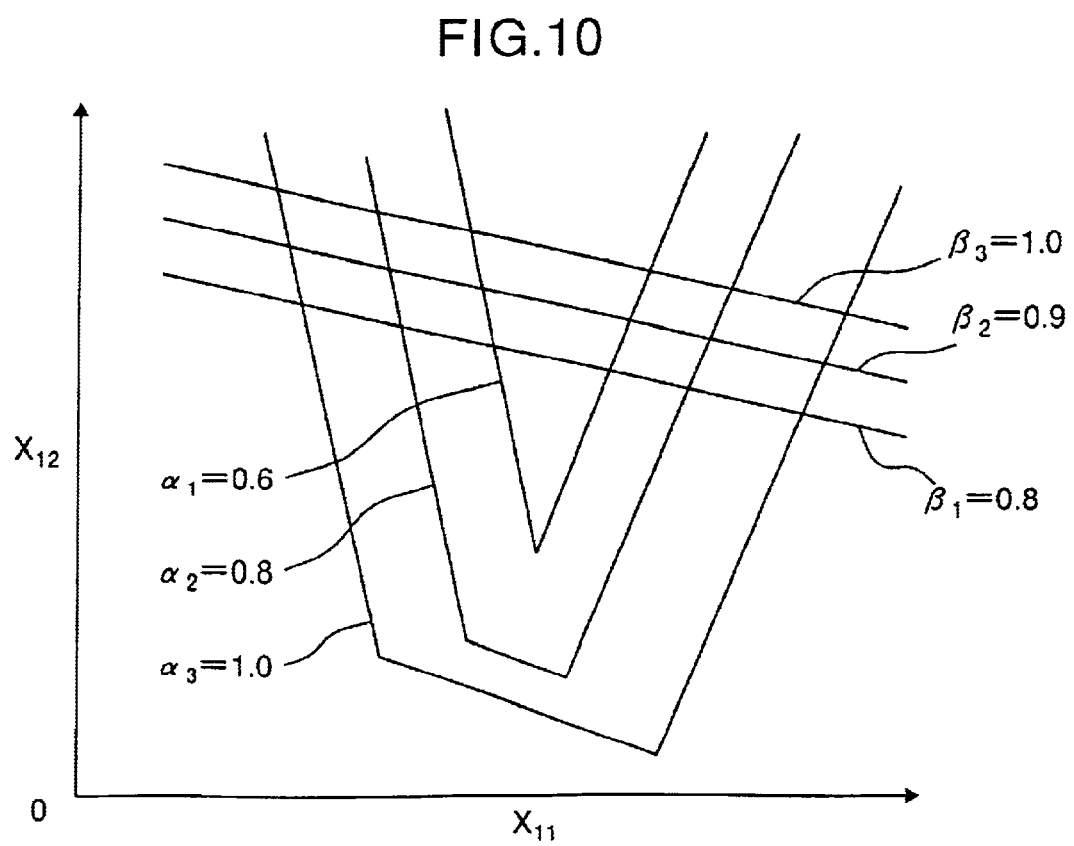

COMBUSTION VIBRATION ESTIMATING APPARATUS, PLANT AND GAS TURBINE PLANT

FIELD OF THE INVENTION

The present invention relates to a combustion vibration estimating apparatus, a plant and a gas turbine plant. More particularly, this invention relates to a combustion vibration estimating apparatus for estimating combustion vibration generated in a combustor of a gas turbine for business or aircraft, and relates to a plant including the combustion vibration estimating apparatus.

BACKGROUND OF THE INVENTION

For adjusting a control system, various approaches were conventionally taken such as Kalman filter or neutral network. However, concerning the combustion vibration of a gas turbine, as matters now stand, its phenomenon is complicated, and field shakedown is adjusted based on experience and know-how of an operator now as in the past.

Concerning monitor of combustion vibration during driving, there is a known technique in which data is collected by a pressure sensor disposed in a combustor, an abnormal condition of the combustion vibration is grasped at an early stage by analyzing frequency of the combustion vibration by this data, and the driving state of the combustor is monitored while attaching importance to soundness.

FIG. 19 shows a combustion abnormality monitoring apparatus (gas turbine abnormality monitoring apparatus) disclosed in Japanese Patent Application Laid-open No. 11-324725. This monitoring apparatus uses a pressure sensor 100 disposed in the gas turbine combustor, an A/D converter 101 for converting a detection signal from the pressure sensor 100 into digital data and receiving the same, a frequency analyzer 102 for decomposing the digital data into frequency component and analyzing the same, a judging condition setting section 103 for variably setting reference data concerning a frequency component to be monitored based on an output of a gas turbine combustor and a parameter defined by a fuel supply amount thereof, a judging processing section 104 for extracting a frequency component caused by combustion vibration phenomenon from analysis data of the frequency component based on the reference data, comparing an amplitude value of the frequency component and an amplitude value of data concerning the frequency component to be monitored under normal conditions with each other, thereby judging the combustion vibration state, and a result display section 105 for displaying data concerning the judgement result.

In this monitoring apparatus, frequency of the combustion vibration is analyzed by data from the pressure sensor 100, the amplitude value of vibration at the time under normal conditions is compared with an actually measured value at every frequency, and it is possible to judge whether the combustion vibration is abnormal.

In the conventional monitoring apparatus, however, it is necessary to previously input an amplitude value of the combustion vibration under normal condition for each frequency, and the value under the normal conditions is substantially a management value for alarm, and combustion vibration can not be detected at an early stage.

SUMMARY OF THE INVENTION

It is an object of the present invention to provide a combustion vibration estimating apparatus in which a combustion control system can be adjusted easier by estimating combustion vibration generated in a combustor of a gas turbine by a mathematical model, generation of the combustion vibration is detected at an early stage during driving, breakage of facilities can be avoided, utilization ratio of facilities can be enhanced, and safety can be enhanced. It is another object of the invention to provide a plant having such a combustion vibration estimating apparatus.

In the combustion vibration estimating apparatus according to one aspect of this invention, a mathematical model for explaining internal pressure variation is constructed from plant data and weather data, a combustion vibration-prone to be generated region and a combustion vibration-less prone to be generated region are obtained based on the constructed mathematical model and are output.

According to the above-mentioned aspect, the combustion vibration-prone to be generated region and the combustion vibration-less prone to be generated region are obtained based on the mathematical model constructed from the plant data and weather data, and a result thereof is output.

The combustion vibration estimating apparatus according to still another aspect of this invention, comprises an inputting unit which inputs limiting values of plant data, weather data and internal pressure variation, an internal pressure variation characteristic grasping unit which makes internal pressure variation of a combustor into a mathematical model from the input plant data and weather data, a combustion vibration region estimating unit which applies a limiting value of the internal pressure variation to the mathematical model obtained by the internal pressure variation characteristic grasping unit to obtain combustion vibration-prone to be generated region, and an outputting unit which outputs a combustion vibration region estimation result by the combustion vibration region estimating unit.

According to the above-mentioned aspect, the internal pressure variation characteristic grasping unit makes the internal pressure variation of the combustor into the mathematical model from the plant data and weather data input by the inputting unit, the combustion vibration region estimating unit applies the limiting value of the internal pressure variation to the mathematical model to obtain the combustion-prone to be generated region, and the combustion vibration region estimation result is output from the outputting unit.

The combustion vibration estimating apparatus according to still another aspect of this invention comprises an inputting unit which inputs plant data and weather data, an internal pressure variation estimating unit which estimates internal pressure variation of a combustor from the input plant data and weather data, and an outputting unit which outputs internal pressure variation estimation result estimated by the internal pressure variation estimating unit.

According to the above-mentioned aspect, the internal pressure variation estimating unit estimates the internal pressure variation of the combustor by the plant data and weather data input by the inputting unit, and the estimated internal pressure variation estimation result is output from the outputting unit.

In the combustion vibration estimating apparatus according to still another aspect of this invention, a mathematical model for explaining internal pressure variation and NOx discharge amount is constructed from plant data and weather data, a combustion vibration-prone to be generated region and a combustion vibration-less prone to be generated region are obtained based on the constructed mathematical model and are output.

According to the above-mentioned aspect, the combustion vibration-less prone to be generated region and combustion vibration-prone to be generated region are obtained based on the mathematical model which explains internal pressure variation and NOx discharge amount constructed from the plant data and weather data to outputs the result.

The combustion vibration estimating apparatus according to still another aspect of this invention comprises an inputting unit which inputs limiting values of plant data, weather data and internal pressure variation, as well as a restricting value of NOx, an internal pressure variation characteristic grasping unit which makes internal pressure variation of a combustor into a mathematical model from the input plant data and weather data, a NOx discharge amount characteristic grasping unit which makes an NOx discharge amount into a mathematical model from the input plant data and weather data, a safe region estimating unit which applies a limiting value of the internal pressure variation to the mathematical model obtained by the internal pressure variation characteristic grasping unit, and applies a restricting value of the NOx to the mathematical model obtained by the NOx discharge amount characteristic grasping unit, thereby obtaining a region where the NOx discharge amount is equal to or less than the restricting value and the combustion vibration is less prone to be generated, and an outputting unit which outputs a safe region estimation result by the safe region estimating unit.

According to the above-mentioned aspect, the internal pressure variation characteristic grasping unit makes the internal pressure variation of the combustor into the mathematical model from the plant data and weather data input from the inputting unit, the NOx discharge amount characteristic grasping unit makes the NOx discharge amount into the mathematical model from the plant data and weather data input by the inputting unit, the safe region estimating unit applies the limiting value of the internal pressure variation and the restricting value of the NOx to the mathematical model to obtain the combustion vibration-less prone to be generated region, and the safe region estimation result is output from the outputting unit.

In the combustion vibration estimating apparatus according to still another aspect of this invention, a mathematical model for explaining internal pressure variation, NOx and a CO discharge amount is constructed from plant data and weather data, a combustion vibration-prone to be generated region and a combustion vibration-less prone to be generated region are obtained based on the constructed mathematical model and are output.

According to the above-mentioned aspect, the combustion vibration-less prone to be generated region and combustion vibration-prone to be generated region are obtained based on the mathematical model which explains the internal pressure variation, NOx discharge amount and the CO discharge amount constructed from the plant data and weather data, and a result thereof is output.

The combustion vibration estimating apparatus according to still another aspect of this invention comprises an inputting unit which inputs limiting values of plant data, weather data and internal pressure variation, as well as restricting values of NOx and CO, an internal pressure variation characteristic grasping unit which makes internal pressure variation of a combustor into a mathematical model from the input plant data and weather data, a NOx discharge amount characteristic grasping unit which makes an NOx discharge amount into a mathematical model from the input plant data and weather data, a CO discharge amount characteristic grasping unit which makes an CO discharge amount into a mathematical model from the input plant data and weather data, a safe region estimating unit which applies a limiting value of the internal pressure variation to the mathematical model obtained by the internal pressure variation characteristic grasping unit, applies a restricting value of the NOx to the mathematical model obtained by the NOx discharge amount characteristic grasping unit, and applies a restricting value of the CO to the mathematical model obtained by the CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

According to the above-mentioned aspect, the internal pressure variation characteristic grasping unit makes the internal pressure variation of the combustor into the mathematical model from the plant data and weather data input by the inputting unit, the NOx discharge amount characteristic grasping unit makes the NOx discharge amount into the mathematical model from the plant data and weather data input by the inputting unit, the CO discharge amount characteristic grasping unit makes the CO discharge amount into the mathematical model from the plant data and weather data input by the inputting unit, the safe region estimating unit applies the limiting value of the internal pressure variation and the restricting values of NOx and CO to the mathematical model, and the region where the discharge amounts of NOx and CO are equal to or less than the restricting value and the combustion vibration is prone to be generated, and the safe region estimation result is output from the outputting unit.

The combustion vibration estimating apparatus according to still another aspect of this invention comprises an inputting unit which inputs limiting values of plant data, weather data and internal pressure variation, as well as restricting values of NOx and CO, a focus setting unit which selects data used for making a mathematical model from the input plant data and weather data, an internal pressure variation characteristic grasping unit which makes internal pressure variation of a combustor into a mathematical model from the selected plant data and weather data, a discharge amount characteristic grasping unit which makes NOx and CO discharge amounts into a mathematical model from the selected plant data and weather data, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

According to the above-mentioned aspect, the internal pressure variation characteristic grasping unit is input by the inputting unit, the internal pressure variation of the combustor is made into the mathematical model from the plant data and weather data selected by the focus setting unit, the discharge amount characteristic grasping unit makes the discharge amounts of NOx and CO into the mathematical model from the plant data and weather data selected by the focus setting unit, the safe region estimating unit applies the limiting value of the internal pressure variation and restricting values of NOx and CO to the mathematical model, a region where the NOx discharge amount and the CO discharge amount are equal to or less than the restricting value and the combustion vibration is less prone to be generated is obtained, and the safe region estimation result is output from the outputting unit.

The combustion vibration estimating apparatus according to still another aspect of this invention comprises an inputting unit which inputs limiting values of plant data, weather data and internal pressure variation, as well as restricting values of NOx and CO, a focus setting unit which selects data used for making a mathematical model from the input plant data and weather data, an internal pressure variation characteristic grasping unit which makes internal pressure variation of a combustor into a mathematical model from the selected plant data and weather data, a discharge amount characteristic grasping unit which makes NOx and CO discharge amounts into a mathematical model from the selected plant data and weather data, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, a proposed adjustment generating unit which obtains a point to be measured next, using a safe region estimation result by the safe region estimating unit, and an outputting unit which outputs a safe region estimation result by the safe region estimating unit and a point to be measured by the proposed adjustment generating unit.

According to the above-mentioned aspect, the internal pressure variation characteristic grasping unit makes the internal pressure variation of the combustor into the mathematical model from the plant data and weather data selected by the focus determining unit, the discharge amount characteristic grasping unit makes the NOx and CO discharge amounts into the mathematical model from the plant data and weather data selected by the focus determining unit, the safe region estimating unit applies the limiting value of the internal pressure variation and the NOx and CO restricting values to the mathematical model, a region where the NOx discharge amount and the CO discharge amount are equal to or less than the restricting value and the combustion vibration is less prone to be generated is obtained, and the proposed adjustment generating unit obtains the point to be measured next using the safe region estimation result by the safe region estimating unit, and the safe region estimation result by the safe region estimating unit and the point to be measured next by the proposed adjustment generating unit are output from the outputting unit.

The plant according to still another aspect of this invention comprises a combustor, and a combustion vibration estimating apparatus which constructs a mathematical model which explains internal pressure variation from plant data and weather data which are obtained with combustion in the combustor, and obtains and outputs a combustion vibration-prone to be generated region and a combustion vibration-less prone to be generated region based on the constructed mathematical model.

According to the above-mentioned aspect, the combustion vibration-prone to be generated region and the combustion vibration-less prone to be generated region are obtained based on the mathematical model constructed from the plant data and weather data, and a result thereof is output.

The plant according to still another aspect of this invention comprises a combustor, and a combustion vibration estimating apparatus having an inputting unit which inputs limiting values of plant data, weather data and internal pressure variation obtained with combustion in the combustor, an internal pressure variation characteristic grasping unit which makes internal pressure variation of a combustor into a mathematical model from the plant data and weather data input from the inputting unit, a combustion vibration region estimating unit which applies a limiting value of the internal pressure variation to the mathematical model obtained by the internal pressure variation characteristic grasping unit to obtain combustion vibration-prone to be generated region, and an outputting unit which outputs a combustion vibration region estimation result by the combustion vibration region estimating unit.

According to the above-mentioned aspect, the internal pressure variation characteristic grasping unit makes the internal pressure variation of the combustor into the mathematical model from the plant data and weather data input by the inputting unit, the combustion vibration region estimating unit applies the limiting value of the internal pressure variation to the mathematical model to obtain the combustion-prone to be generated region, and the combustion vibration region estimation result is output from the outputting unit.

The plant according to still another aspect of this invention comprises a combustor, and a combustion vibration estimating apparatus having an inputting unit which inputs plant data and weather data obtained with combustion in the combustor, an internal pressure variation estimating unit which estimates internal pressure variation of the combustor from the plant data and weather data which are input from the inputting unit, and an outputting unit which outputs internal pressure variation estimation result estimated by the internal pressure variation estimating unit.

According to the above-mentioned aspect, the internal pressure variation estimating unit estimates the internal pressure variation of the combustor by the plant data and weather data input by the inputting unit, and the estimated internal pressure variation estimation result is output from the outputting unit.

The plant according to still another aspect of this invention comprises a combustor, and a combustion vibration estimating apparatus which constructs a mathematical model which explains internal pressure variation and an NOx discharge amount from plant data and weather data which are obtained with combustion in the combustor, and obtains and outputs a combustion vibration-prone to be generated region and a combustion vibration-less prone to be generated region based on the constructed mathematical model.

According to the above-mentioned aspect, the combustion vibration-less prone to be generated region and combustion vibration-prone to be generated region are obtained based on the mathematical model which explains internal pressure variation and NOx discharge amount constructed from the plant data and weather data.

The plant according to still another aspect of this invention comprises a combustor, and a combustion vibration estimating apparatus having an inputting unit which inputs limiting values of plant data, weather data obtained with combustion in the combustor and internal pressure variation, as well as a restricting value of NOx, an internal pressure variation characteristic grasping unit which makes internal pressure variation of a combustor into a mathematical model from the plant data and weather data input from the inputting unit, a NOx discharge amount characteristic grasping unit which makes an NOx discharge amount into a mathematical model from the input plant data and weather data input from the inputting unit, a safe region estimating unit which applies a limiting value of the internal pressure variation to the mathematical model obtained by the internal pressure variation characteristic grasping unit, and applies a restricting value of the NOx to the mathematical model obtained by the NOx discharge amount characteristic grasping unit, thereby obtaining a region where the NOx discharge amount is equal to or less than the restricting value and the combustion vibration is less prone to be generated, and an outputting unit which outputs a safe region estimation result by the safe region estimating unit.

According to the above-mentioned aspect, the internal pressure variation characteristic grasping unit makes the internal pressure variation of the combustor into the mathematical model from the plant data and weather data input from the inputting unit, the NOx discharge amount characteristic grasping unit makes the NOx discharge amount into the mathematical model from the plant data and weather data input by the inputting unit, the safe region estimating unit applies the limiting value of the internal pressure variation and the restricting value of the NOx to the mathematical model to obtain the combustion vibration-less prone to be generated region, and the safe region estimation result is output from the outputting unit.

The plant according to still another aspect of this invention comprises a combustor, and a combustion vibration estimating apparatus which constructs a mathematical model for explaining internal pressure variation, NOx and a CO discharge amount from plant data and weather data obtained with combustion in the combustor, a combustion vibration-prone to be generated region and a combustion vibration-less prone to be generated region are obtained based on the constructed mathematical model and are output.

According to the above-mentioned aspect, the combustion vibration-less prone to be generated region and combustion vibration-prone to be generated region are obtained based on the mathematical model which explains the internal pressure variation, NOx discharge amount and the CO discharge amount constructed from the plant data and weather data, and a result thereof is output.

The plant according to still another aspect of this invention comprises a combustor, and a combustion vibration estimating apparatus having an inputting unit which inputs limiting values of plant data, weather data obtained with combustion in the combustor and internal pressure variation, as well as restricting values of NOx and CO, an internal pressure variation characteristic grasping unit which makes internal pressure variation of a combustor into a mathematical model from the plant data and weather data input by the inputting unit, a NOx discharge amount characteristic grasping unit which makes an NOx discharge amount into a mathematical model from the plant data and weather data input by the inputting unit, a CO discharge amount characteristic grasping unit which makes an CO discharge amount into a mathematical model from the plant data and weather data input by the inputting unit, a safe region estimating unit which applies a limiting value of the internal pressure variation to the mathematical model obtained by the internal pressure variation characteristic grasping unit, applies a restricting value of the NOx to the mathematical model obtained by the NOx discharge amount characteristic grasping unit, and applies a restricting value of the CO to the mathematical model obtained by the CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

According to the above-mentioned aspect, the internal pressure variation characteristic grasping unit makes the internal pressure variation of the combustor into the mathematical model from the plant data and weather data input by the inputting unit, the NOx discharge amount characteristic grasping unit makes the NOx discharge amount into the mathematical model from the plant data and weather data input by the inputting unit, the CO discharge amount characteristic grasping unit makes the CO discharge amount into the mathematical model from the plant data and weather data input by the inputting unit, the safe region estimating unit applies the limiting value of the internal pressure variation and the restricting values of NOx and CO to the mathematical model, and the region where the discharge amounts of NOx and CO are equal to or less than the restricting value and the combustion vibration is prone to be generated, and the safe region estimation result is output from the outputting unit.

The plant according to still another aspect of this invention comprises a combustor, and a combustion vibration estimating apparatus having inputting unit which inputs limiting values of plant data, weather data obtained with combustion in the combustor and internal pressure variation, as well as restricting values of NOx and CO, a focus setting unit which selects data used for making a mathematical model from the plant data and weather data input by the inputting unit, an internal pressure variation characteristic grasping unit which makes internal pressure variation of a combustor into a mathematical model from the plant data and weather data selected by the focus setting unit, a discharge amount characteristic grasping unit which makes NOx and CO discharge amounts into a mathematical model from the plant data and weather data selected by the focus setting unit, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

According to the above-mentioned aspect, the internal pressure variation characteristic grasping unit is input by the inputting unit, the internal pressure variation of the combustor is made into the mathematical model from the plant data and weather data selected by the focus setting unit, the discharge amount characteristic grasping unit makes the discharge amounts of NOx and CO into the mathematical model from the plant data and weather data selected by the focus setting unit, the safe region estimating unit applies the limiting value of the internal pressure variation and restricting values of NOx and CO to the mathematical model, a region where the NOx discharge amount and the CO discharge amount are equal to or less than the restricting value and the combustion vibration is less prone to be generated is obtained, and the safe region estimation result is output from the outputting unit.

The plant according to still another aspect of this invention comprises a combustor, and a combustion vibration estimating apparatus having an inputting unit which inputs limiting values of plant data, weather data obtained with combustion in the combustor and internal pressure variation, as well as restricting values of NOx and CO, a focus setting unit which selects data used for making a mathematical model from the plant data and weather data input by the inputting unit, an internal pressure variation characteristic grasping unit which makes internal pressure variation of a combustor into a mathematical model from the plant data and weather data selected by the focus setting unit, a discharge amount characteristic grasping unit which makes NOx and CO discharge amounts into a mathematical model from the plant data and weather data selected by the focus setting unit, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, a proposed adjustment generating unit which obtains a point to be measured next, using a safe region estimation result by the safe region estimating unit, and an outputting unit which outputs a safe region estimation result by the safe region estimating unit and a point to be measured by the proposed adjustment generating unit.

According to the above-mentioned aspect, the internal pressure variation characteristic grasping unit makes the internal pressure variation of the combustor into the mathematical model from the plant data and weather data selected by the focus determining unit, the discharge amount characteristic grasping unit makes the NOx and CO discharge amounts into the mathematical model from the plant data and weather data selected by the focus determining unit, the safe region estimating unit applies the limiting value of the internal pressure variation and the NOx and CO restricting values to the mathematical model, a region where the NOx discharge amount and the CO discharge amount are equal to or less than the restricting value and the combustion vibration is less prone to be generated is obtained, and the proposed adjustment generating unit obtains the point to be measured next using the safe region estimation result by the safe region estimating unit, and the safe region estimation result by the safe region estimating unit and the point to be measured next by the proposed adjustment generating unit are output from the outputting unit.

The gas turbine plant according to still another aspect of this invention comprises a gas turbine having a combustor, a compressor for supplying compressed air to the combustor, an inlet guide blade for supplying air to the compressor, a turbine which is connected to the compressor and is rotated by emission gas of the combustor, a main fuel flowrate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus which constructs a mathematical model which explains internal pressure variation from plant data and weather data which are obtained with combustion in the combustor, and obtains and outputs a combustion vibration-prone to be generated region and a combustion vibration-less prone to be generated region based on the constructed mathematical model.

According to the above-mentioned aspect, the combustion vibration-prone to be generated region and the combustion vibration-less prone to be generated region are obtained based on the mathematical model constructed from the plant data and weather data, and a result thereof is output.

The gas turbine plant according to still another aspect of this invention comprises a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus having an inputting unit which inputs limiting values of plant data, weather data and internal pressure variation obtained with combustion in the combustor, an internal pressure variation characteristic grasping unit which makes internal pressure variation of a combustor into a mathematical model from the plant data and weather data input from the inputting unit, a combustion vibration region estimating unit which applies a limiting value of the internal pressure variation to the mathematical model obtained by the internal pressure variation characteristic grasping unit to obtain combustion vibration-prone to be generated region, and an outputting unit which outputs a combustion vibration region estimation result by the combustion vibration region estimating unit.

According to the above-mentioned aspect, the internal pressure variation characteristic grasping unit makes the internal pressure variation of the combustor into the mathematical model from the plant data and weather data input by the inputting unit, the combustion vibration region estimating unit applies the limiting value of the internal pressure variation to the mathematical model to obtain the combustion-prone to be generated region, and the combustion vibration region estimation result is output from the outputting unit.

The gas turbine plant according to still another aspect of this invention comprises a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus having an inputting unit which inputs plant data and weather data obtained with combustion in the combustor, an internal pressure variation estimating unit which estimates internal pressure variation of the combustor from the plant data and weather data which are input from the inputting unit, and an outputting unit which outputs internal pressure variation estimation result estimated by the internal pressure variation estimating unit.

According to the above-mentioned aspect, the internal pressure variation estimating unit estimates the internal pressure variation of the combustor by the plant data and weather data input by the inputting unit, and the estimated internal pressure variation estimation result is output from the outputting unit.

The gas turbine plant according to still another aspect of this invention comprises a gas turbine having a combustor, a compressor for supplying compressed air to the combustor, an inlet guide blade for supplying air to the compressor, a turbine which is connected to the compressor and is rotated by emission gas of the combustor, a main fuel flowrate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus which constructs a mathematical model which explains internal pressure variation and an NOx discharge amount from plant data and weather data which are obtained with combustion in the combustor, and obtains and outputs a combustion vibration-prone to be generated region and a combustion vibration-less prone to be generated region based on the constructed mathematical model.

According to the above-mentioned aspect, the combustion vibration-less prone to be generated region and combustion vibration-prone to be generated region are obtained based on the mathematical model which explains internal pressure variation and NOx discharge amount constructed from the plant data and weather data.

The gas turbine plant according to still another aspect of this invention comprises a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus having an inputting unit which inputs limiting values of plant data, weather data obtained with combustion in the combustor and internal pressure variation, as well as a restricting value of NOx, an internal pressure variation characteristic grasping unit which makes internal pressure variation of a combustor into a mathematical model from the plant data and weather data input from the inputting unit, a NOx discharge amount characteristic grasping unit which makes an NOx discharge amount into a mathematical model from the input plant data and weather data input from the inputting unit, a safe region estimating unit which applies a limiting value of the internal pressure variation to the mathematical model obtained by the internal pressure variation characteristic grasping unit, and applies a restricting value of the NOx to the mathematical model obtained by the NOx discharge amount characteristic grasping unit, thereby obtaining a region where the NOx discharge amount is equal to or less than the restricting value and the combustion vibration is less prone to be generated, and an outputting unit which outputs a safe region estimation result by the safe region estimating unit.

According to the above-mentioned aspect, the internal pressure variation characteristic grasping unit makes the internal pressure variation of the combustor into the mathematical model from the plant data and weather data input from the inputting unit, the NOx discharge amount characteristic grasping unit makes the NOx discharge amount into the mathematical model from the plant data and weather data input by the inputting unit, the safe region estimating unit applies the limiting value of the internal pressure variation and the restricting value of the NOx to the mathematical model to obtain the combustion vibration-less prone to be generated region, and the safe region estimation result is output from the outputting unit.

The gas turbine plant according to still another aspect of this invention comprises a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus which constructs a mathematical model for explaining internal pressure variation, NOx and a CO discharge amount from plant data and weather data obtained with combustion in the combustor, a combustion vibration-prone to be generated region and a combustion vibration-less prone to be generated region are obtained based on the constructed mathematical model and are output.

According to the above-mentioned aspect, the combustion vibration-less prone to be generated region and combustion vibration-prone to be generated region are obtained based on the mathematical model which explains the internal pressure variation, NOx discharge amount and the CO discharge amount constructed from the plant data and weather data, and a result thereof is output.

The gas turbine plant according to still another aspect of this invention comprises a gas turbine having a combustor, a compressor for supplying compressed air to the combustor, an inlet guide blade for supplying air to the compressor, a turbine which is connected to the compressor and is rotated by emission gas of the combustor, a main fuel flowrate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus having an inputting unit which inputs limiting values of plant data, weather data obtained with combustion in the combustor and internal pressure variation, as well as restricting values of NOx and CO, an internal pressure variation characteristic grasping unit which makes internal pressure variation of a combustor into a mathematical model from the plant data and weather data input by the inputting unit, a NOx discharge amount characteristic grasping unit which makes an NOx discharge amount into a mathematical model from the plant data and weather data input by the inputting unit, a CO discharge amount characteristic grasping unit which makes an CO discharge amount into a mathematical model from the plant data and weather data input by the inputting unit, a safe region estimating unit which applies a limiting value of the internal pressure variation to the mathematical model obtained by the internal pressure variation characteristic grasping unit, applies a restricting value of the NOx to the mathematical model obtained by the NOx discharge amount characteristic grasping unit, and applies a restricting value of the CO to the mathematical model obtained by the CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

According to the above-mentioned aspect, the internal pressure variation characteristic grasping unit makes the internal pressure variation of the combustor into the mathematical model from the plant data and weather data input by the inputting unit, the NOx discharge amount characteristic grasping unit makes the NOx discharge amount into the mathematical model from the plant data and weather data input by the inputting unit, the CO discharge amount characteristic grasping unit makes the CO discharge amount into the mathematical model from the plant data and weather data input by the inputting unit, the safe region estimating unit applies the limiting value of the internal pressure variation and the restricting values of NOx and CO to the mathematical model, and the region where the discharge amounts of NOx and CO are equal to or less than the restricting value and the combustion vibration is prone to be generated, and the safe region estimation result is output from the outputting unit.

The gas turbine plant according to still another aspect of this invention comprises a gas turbine having a combustor, a compressor for supplying compressed air to the combustor, an inlet guide blade for supplying air to the compressor, a turbine which is connected to the compressor and is rotated by emission gas of the combustor, a main fuel flowrate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus having an inputting unit which inputs limiting values of plant data, weather data obtained with combustion in the combustor and internal pressure variation, as well as restricting values of NOx and CO, a focus setting unit which selects data used for making a mathematical model from the plant data and weather data input by the inputting unit, an internal pressure variation characteristic grasping unit which makes internal pressure variation of a combustor into a mathematical model from the plant data and weather data selected by the focus setting unit, a discharge amount characteristic grasping unit which makes NOx and CO discharge amounts into a mathematical model from the plant data and weather data selected by the focus setting unit, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

According to the above-mentioned aspect, the internal pressure variation characteristic grasping unit is input by the inputting unit, the internal pressure variation of the combustor is made into the mathematical model from the plant data and weather data selected by the focus setting unit, the discharge amount characteristic grasping unit makes the discharge amounts of NOx and CO into the mathematical model from the plant data and weather data selected by the focus setting unit, the safe region estimating unit applies the limiting value of the internal pressure variation and restricting values of NOx and CO to the mathematical model, a region where the NOx discharge amount and the CO discharge amount are equal to or less than the restricting value and the combustion vibration is less prone to be generated is obtained, and the safe region estimation result is output from the outputting unit.

The gas turbine plant according to still another aspect of this invention comprises a gas turbine having a combustor, a compressor for supplying compressed air to the combustor, an inlet guide blade for supplying air to the compressor, a turbine which is connected to the compressor and is rotated by emission gas of the combustor, a main fuel flowrate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus having an inputting unit which inputs limiting values of plant data, weather data obtained with combustion in the combustor and internal pressure variation, as well as restricting values of NOx and CO, a focus setting unit which selects data used for making a mathematical model from the plant data and weather data input by the inputting unit, an internal pressure variation characteristic grasping unit which makes internal pressure variation of a combustor into a mathematical model from the plant data and weather data selected by the focus setting unit, a discharge amount characteristic grasping unit which makes NOx and CO discharge amounts into a mathematical model from the plant data and weather data selected by the focus setting unit, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, a proposed adjustment generating unit which obtains a point to be measured next, using a safe region estimation result by the safe region estimating unit, and an outputting unit which outputs a safe region estimation result by the safe region estimating unit and a point to be measured by the proposed adjustment generating unit.

According to the above-mentioned aspect, the internal pressure variation characteristic grasping unit makes the internal pressure variation of the combustor into the mathematical model from the pwd selected by the focus determining unit, the discharge amount characteristic grasping unit makes the NOx and CO discharge amounts into the mathematical model from the plant data and weather data selected by the focus determining unit, the safe region estimating unit applies the limiting value of the internal pressure variation and the NOx and CO restricting values to the mathematical model, a region where the NOx discharge amount and the CO discharge amount are equal to or less than the restricting value and the combustion vibration is less prone to be generated is obtained, and the proposed adjustment generating unit obtains the point to be measured next using the safe region estimation result by the safe region estimating unit, and the safe region estimation result by the safe region estimating unit and the point to be measured next by the proposed adjustment generating unit are output from the outputting unit.

Other objects and features of this invention will become apparent from the following description with reference to the accompanying drawings.

BRIEF DESCRIPTION OF THE DRAWINGS

FIG. 9 is a principle view of an estimation method of an NOx restriction level in the combustion vibration estimating apparatus according to the third embodiment of the invention, FIG. 10 is a graph showing an example of output of the safe region in the combustion vibration estimating apparatus according to the third embodiment of the invention.

DETAILED DESCRIPTION

Embodiments of an optical amplifier apparatus according to the present invention will be explained in detail below with reference to the attached drawings.

Figure 1:
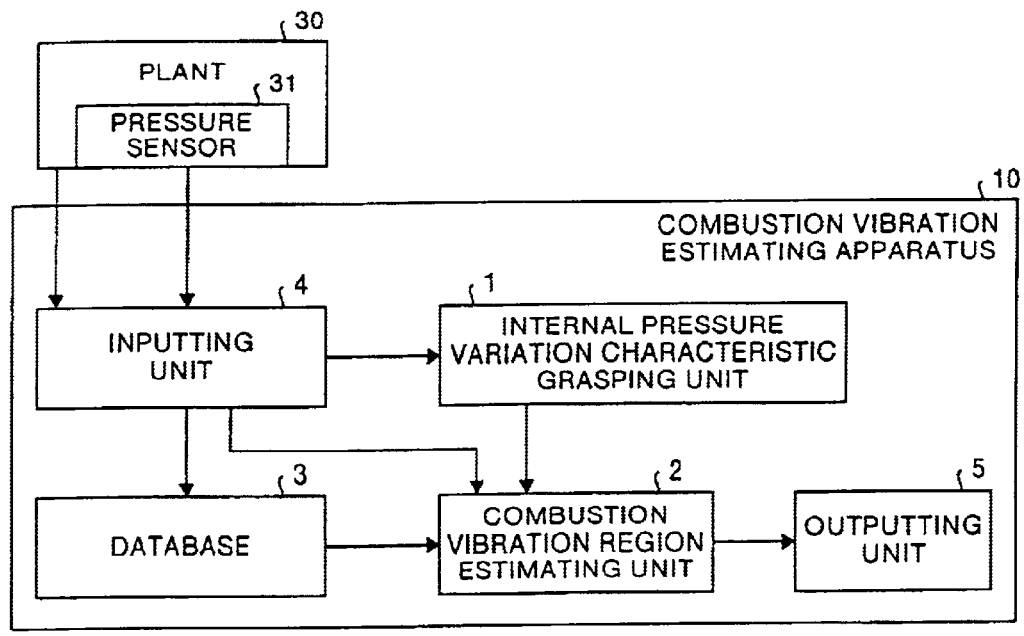
FIG. 1 is a block diagram of a combustion vibration estimating apparatus according to a first embodiment of the present invention.

FIG. 1 shows a structure of a first embodiment of a combustion vibration estimating apparatus of the present invention. In FIG. 1, a symbol 10 represents the entire combustion vibration estimating apparatus. The combustion vibration estimating apparatus 10 comprises a internal pressure variation characteristic grasping unit 1 for making an internal pressure variation of a combustor into a mathematical model, a combustion vibration region estimating unit 2 for obtaining combustion vibration-prone to be generated region, a database 3 in which plant data and weather data are stored in a time series, inputting unit 4 for inputting the plant data, the weather data and a limiting value and the like of internal pressure variation, and outputting unit 5 which outputs a combustion vibration region estimation result. A plant 30 of to-be estimated combustion vibration is connected to the inputting unit 4.

The internal pressure variation characteristic grasping unit 1 constructs a mathematical model which explains the internal pressure variation using data stored in the database 3. For example, if the number of combustors is defined as $n_1$ and the number of frequency bands is defined as $n_2$, the internal pressure variation is made into a mathematical model with a multi-regression model.

$$Y_{ji}=a_{ij.0}+a_{ij.1}\times X_{11}+a_{ij.2}\times X_{12}+a_{ij.3}\times X_{21}+a_{ij.4}\times X_{22} \quad (1)$$

In equation (1), $Y_{ji}$: internal pressure variation value of a j-th frequency band of a first i combustor($i=1, \ldots, n_1, j=1, \ldots, n_2$)

$X_{11}$: value of manipulated variable 1

$X_{12}$: value of manipulated variable 2

$X_{21}$: value of quantity of non-manipulatable state 1

$X_{22}$: value of quantity of non-manipulatable state 2

$a_{ij.0}, a_{ij.1}, a_{ij.2}, a_{ij.3}, a_{ij.4}$: coefficient parameter

The internal pressure variation characteristic grasping unit 1 obtains coefficient parameters $a_{ij.0}, a_{ij.1}, a_{ij.2}, a_{ij.3}, a_{ij.4}$ of the equation (1) using internal pressure variation values, manipulated variables, quantity of non-manipulatable states organized and stored at time periods in the database 3, and sends these parameters to the combustion vibration region estimating unit 2. As a solution of the coefficient parameters, a method of least squares is used for example.

The term "internal pressure variation value" is explained below. Data obtained from a pressure sensor (internal pressure sensor) 31 disposed in the plant 30 is A/D converted, a result of frequency analysis of the converted value is divided into $n_2$-number of frequency bands, and a maximum amplitude value for a certain time period in each frequency band is the internal pressure variation value. For the sake of explanation, a model formula is described based on that the number of manipulated variables is two and the quantity of non-manipulatable states is two, but the number is not limited to two.

The combustion vibration region estimating unit 2 obtains combustion vibration-prone to be generated region using the mathematical model obtained by the internal pressure variation characteristic grasping unit 1.

For example, internal pressure variation estimated value $Y'_{ij}$ of a j-th frequency band of an i-th combustor of when a manipulated variable 1, a manipulated variable 2, quantity of non-manipulatable state 1 and quantity of non-manipulatable state 2 are $X'_{11}$, $X'_{12}$, $X'_{21}$, $X'_{22}$, respectively, is obtained by the following equation (2):

$$Y'_{ij} = a_{ij.0} + a_{ij.1} \times X'_{11} + a_{ij.2} \times X'_{12} + a_{ij.3} \times X'_{21} + a_{ij.4} \times X'_{22} \quad (2)$$

In equation (2), $a_{ij.0}$, $a_{ij.1}$, $a_{ij.2}$, $a_{ij.3}$, $a_{ij.4}$ are coefficient parameters sent from the internal pressure variation characteristic grasping unit 1.

A limiting value is provided in an internal pressure variation of the f-th frequency band of the i-th combustor for a structural reason of the combustor or peripheral equipment. If the limiting value of internal pressure variation of the f-th frequency band of the i-th combustor sent from the inputting unit 4 is defined as $Z_{ij}$, this means that there exist $X'_{11}$, $X'_{12}$, $X'_{21}$, $X'_{22}$ which satisfied the following equation:

$$Z_{ij} = a_{ij.0} + a_{ij.1} \times X'_{11} + a_{ij.2} \times X'_{12} + a_{ij.3} \times X'_{21} + a_{ij.4} \times X'_{22} \quad (3)$$

If values of the quantity of non-manipulatable state 1 and quantity of non-manipulatable state 2 are input in the inputting unit 4, and if these input values are sent to the combustion vibration region estimating unit 2, every value in the equation (3) except $X'_{11}$ and $X'_{12}$ is a constant, and it is easy to obtain the ($X'_{11}$, and $X'_{12}$) which satisfy the equation (3). If the ($X'_{11}$ and $X'_{12}$) are obtained from gain which is $\alpha k (k=1, \ldots, n_3)$ sent from the inputting unit 4 using the following equation, $n_3$ number of lines can be obtained in each frequency band of each combustor:

$$\alpha k X Z_{ij} = a_{ij.0} + a_{ij.1} \times X'_{11} + a_{ij.2} \times X'_{12} + a_{ij.3} \times X'_{21} + a_{ij.4} \times X'_{22} \quad (4)$$

Figure 2:
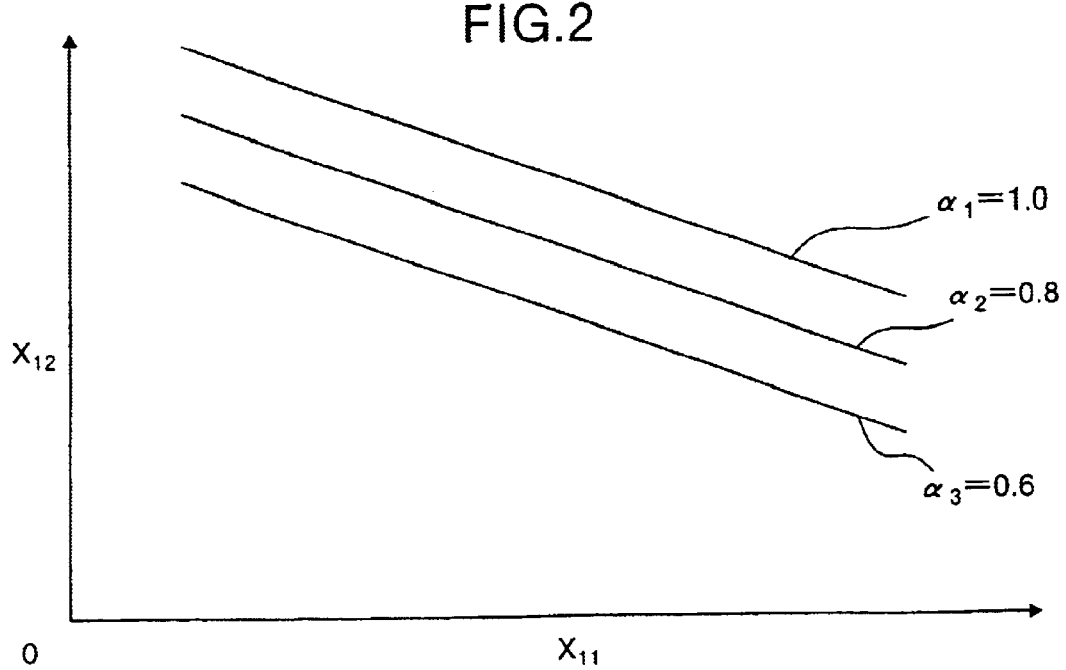
FIG. 2 is a principle view of an estimation method of a combustion vibration region according to the first embodiment of the invention.

FIG. 2 shows this. If the coefficient parameter $a_{ij.2}$ is positive, an upper side of the straight line is a combustion vibration-prone to be generated region and a lower side is a combustion vibration-less prone to be generated region. If the coefficient parameter $a_{ij.2}$ is negative on the contrary, the lower side of the straight line is the combustion vibration-prone to be generated region, and the upper side is the combustion vibration-less prone to be generated region.

The combustion vibration region estimating unit 2 obtains the above-described straight lines for full frequency bands of all the combustors from limiting values $Z_{ij}$ ($i=1, \ldots, n_1$, $j=1, \ldots, n_2$), gain$\alpha k (k=1, \ldots, n_3)$ and values of variables except of the j-th frequency band of the i-th combustor sent from the inputting unit 4, and from coefficient parameter $a_{ij.0}$, $a_{ij.1}$, $a_{ij.2}$, $a_{ij.3}$, $a_{ij.4}$($i=1, \ldots, n_1$, $j=1, \ldots, n_2$) sent from the internal pressure variation characteristic grasping unit 1, and finally obtains combustion vibration-prone to be generated region and combustion vibration-less prone to be generated region based on the procedure of linear programming, and sends the same to the outputting unit 5.

In the database 3, the internal pressure variation values, manipulated variables, quantity of non-manipulatable state are organized and stored in the time series at time periods, and if the data is sent from the inputting unit 4, the data is additionally stored in the database 3.

The inputting unit 4 receives the plant data and weather data sent from the plant 30 outside the combustion vibration estimating apparatus 10 to output to the database 3. The plant data and weather data include the internal pressure variation values, manipulated variables and quantity of non-manipulatable state. The limiting values $Z_{ij}$ ($i=1, \ldots, n_1$, $j=1, \ldots, n_2$), gain$\alpha k (k=1, \ldots, n_3)$ and values of variables except of the j-th frequency band of the i-th combustor are sent from a device such as a keyboard or touch screen provided in the inputting unit 4 to the combustion vibration region estimating unit 2.

Figure 3:
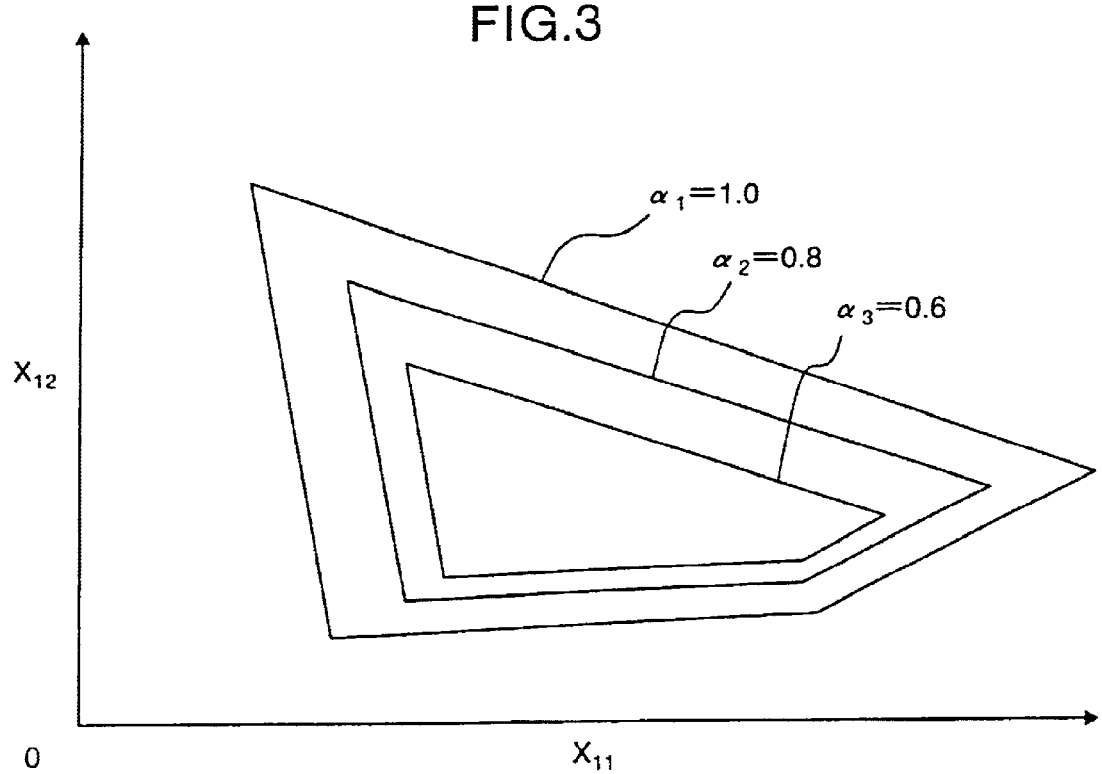
FIG. 3 is a graph showing an example of output of the combustion vibration region in the combustion vibration estimating apparatus according to the first embodiment of the invention.

The outputting unit 5 outputs an estimation result sent from the combustion vibration region estimating unit 2. FIG. 3 shows an example of output in which a combustion vibration region is output. In FIG. 3, the horizontal axis is $X_{11}$ and the vertical axis is $X_{12}$. In this example, the combustion vibration regions are shown like contour lines per each gain $\alpha k$. A central portion is the combustion vibration-less prone to be generated region and outer portion is combustion vibration-prone to be generated region. The region is output to a display device such as a CRT or a printer provided in the outputting unit.

As explained above, according to this combustion vibration estimating apparatus 10, combustion vibration generated in a combustor of a gas turbine is estimated by the mathematical model, and based on this, the combustion control system can easily be controlled, the breakage of facilities can be avoided, the utilization ratio of facilities can be enhanced, and safety can also be enhanced.

Although the plant data and weather data are input from the plant 30 in the above embodiment, the data may be input directly manually from a keyboard provided in the inputting unit 4. The model structure is described as being one liner order, but it may be a higher-order model of two orders or more. The model formula is described as being formula using manipulated variable or quantity of non-manipulatable state input from the plant 30, but a value converted based on physical characteristics may be used.

Figure 4:
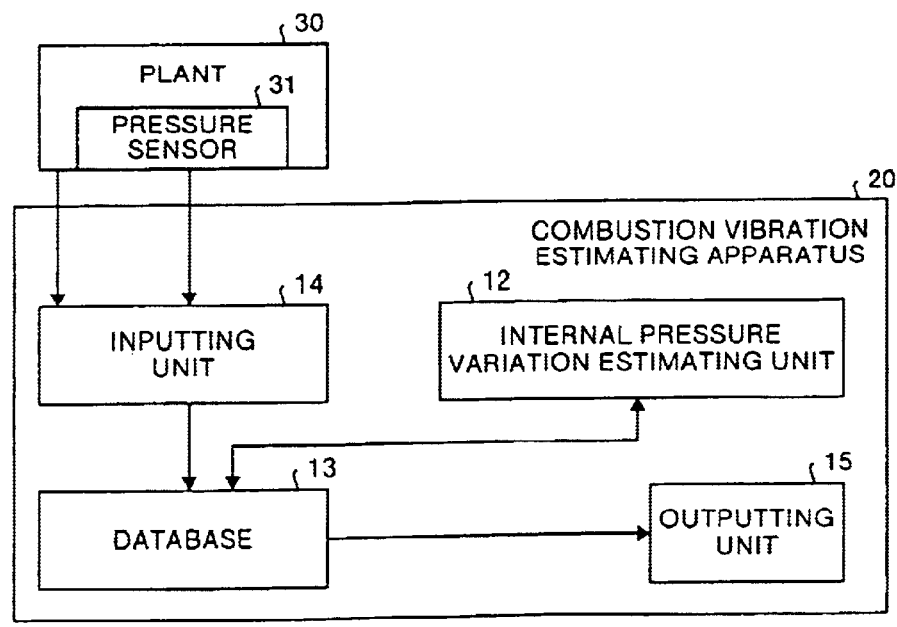
FIG. 4 is a block diagram of the combustion vibration estimating apparatus according to a second embodiment of the invention.

FIG. 4 shows a structure of a second embodiment of the combustion vibration estimating apparatus of the present invention. In FIG. 4, a symbol 20 represents the entire combustion vibration estimating apparatus. The combustion vibration estimating apparatus 20 comprises an internal pressure variation estimating unit 12 for estimating an internal pressure variation of a combustor, a database 13 for storing plant data and weather data in time series, inputting unit 14 for inputting the plant data and weather data, and an outputting unit 15 for outputting an internal pressure variation estimation result. A plant 30 whose combustion vibration is to be estimated is connected to the inputting unit 14.

The internal pressure variation estimating unit 12 estimates a value of an internal pressure variation using the latest internal pressure variation value, manipulated variable and quantity of non-manipulatable state stored in the database 13, and sends the internal pressure variation estimated value to the database 13. For example, if the number of combustor is $n_1$ and the number of frequency bands is $n_2$, the internal pressure variation estimated value is estimated with the multi-regression model:

$$Y'_{ij} = a_{ij.0} + a_{ij.1} \times X_{11} + a_{ij.2} \times X_{12} + a_{ij.3} \times X_{21} + a_{ij.4} \times X_{22} \quad (5)$$

In equation (5), $Y_{ji}$: internal pressure variation value of a j-th frequency band of a first i combustor($i=1, \ldots, n_1$, $j=1, \ldots, n_2$)

$X_{11}$: value of manipulated variable 1

$X_{12}$: value of manipulated variable 2

$X_{21}$: value of quantity of non-manipulatable state 1

$X_{22}$: value of quantity of non-manipulatable state 2

$a_{ij.0}$, $a_{ij.1}$, $a_{ij.2}$, $a_{ij.3}$, $a_{ij.4}$: coefficient parameter The coefficient parameter has previously been obtained by analysis, and stored in the internal pressure variation estimating unit 12. The term "internal pressure variation value" is explained below. Data obtained from a pressure sensor (internal pressure sensor) 31 disposed in the plant 30 is A/D converted, a result of frequency analysis of the converted value is divided into $n_2$-number of frequency bands, and a maximum amplitude value for a certain time period in each frequency band is the internal pressure variation value.

For the sake of explanation, a model formula is described based on that the number of manipulated variables is two and the quantity of non-manipulatable states is two, but the number is not limited to two. The model structure is described as being one liner order, but it may be a higher-order model of two orders or more or may be non-liner model such as neutral network. The model formula is described as being formula using manipulated variable or quantity of non-manipulatable state input from the plant 30, but a value converted based on law of mass balance may be used.

In the database 13, the internal pressure variation values, manipulated variables, quantity of non-manipulatable state are organized and stored in the time series at time periods, and if the data is sent from the inputting unit 14 or the internal pressure variation estimating unit 12, the data is additionally stored in the database 13.

The inputting unit 14 receives the plant data and weather data sent from the plant 30 outside the combustion vibration estimating apparatus 20. The plant data and weather data include the internal pressure variation values, manipulated variables and quantity of non-manipulatable state.

Figure 5:
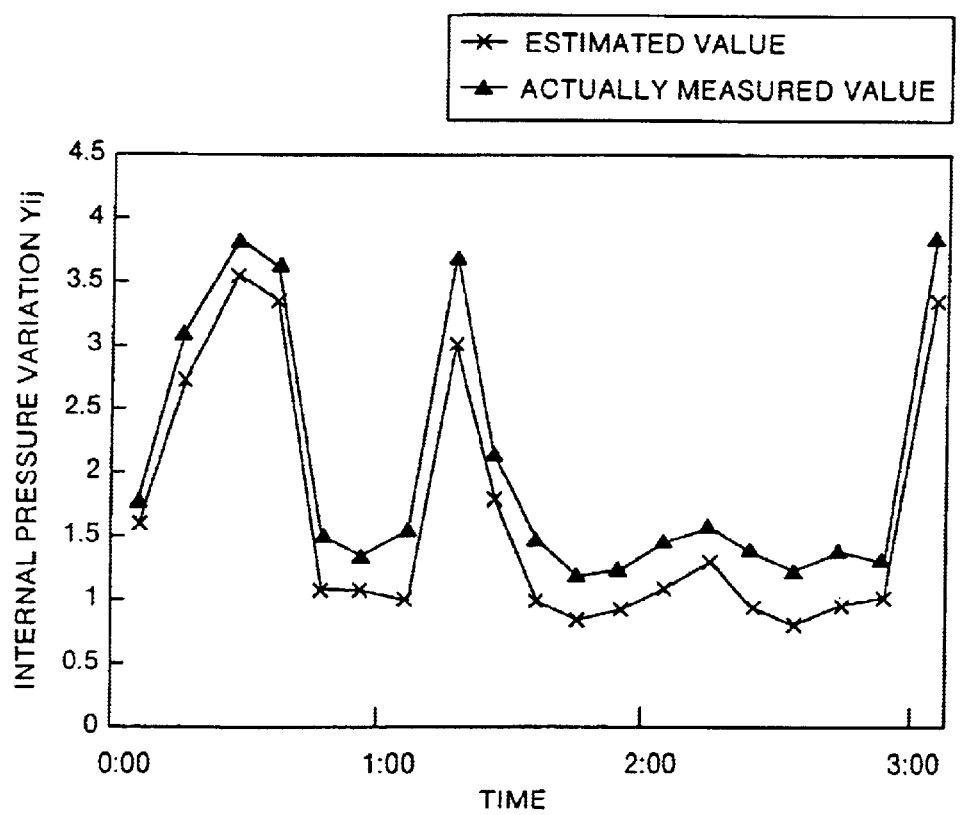
FIG. 5 is a graph showing an example of output of the combustion vibration region in the combustion vibration estimating apparatus according to the second embodiment of the invention.

The outputting unit 15 outputs data stored in the database 13. FIG. 5 shows an example in which an actually measured value $Y_{ji}$ and its estimated value $Y'_{ij}$ of an internal pressure variation of the j-th frequency band of the i-th combustor. In FIG. 5, the horizontal axis shows time and the vertical axis shows the internal pressure variation $Y_{ij}$. The value is output to a display device such as a CRT or a printer provided in the outputting unit.

As described above, according to this embodiment, the estimated value and the actually measured value of the internal pressure variation can be output at the same time, it is possible to judge whether the internal pressure variation of the gas turbine combustor is at a level as planned, generation of the combustion vibration can be detected at an early stage, the breakage of facilities can be avoided, the utilization ratio of facilities can be enhanced, and safety can also be enhanced.

Figure 6:
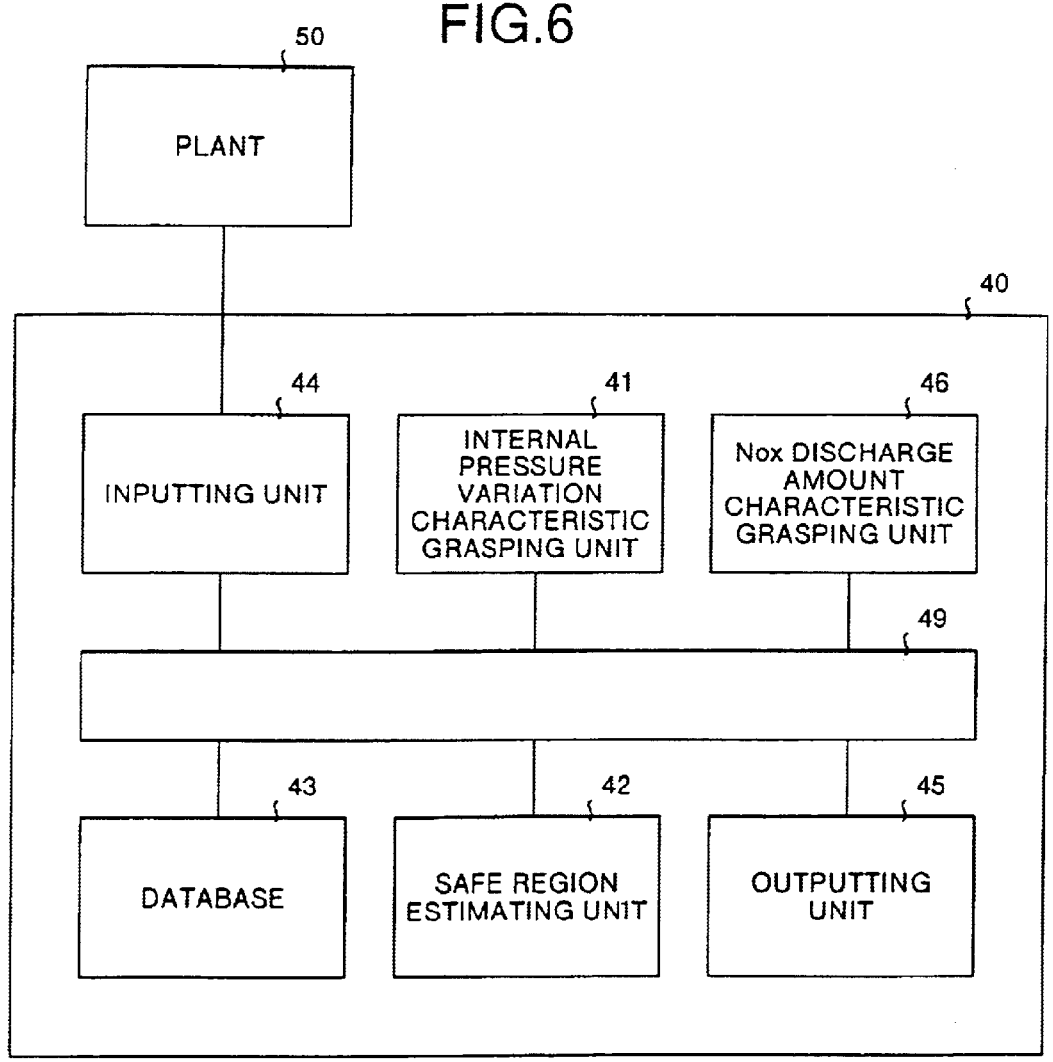
FIG. 6 is a block diagram of the combustion vibration estimating apparatus according to a third embodiment of the invention.

FIG. 6 shows a structure of a third embodiment of the combustion vibration estimating apparatus of the present invention. In FIG. 6, a symbol 40 represents the entire combustion vibration estimating apparatus. The combustion vibration estimating apparatus 40 comprises an internal pressure variation characteristic grasping unit 41 for making an internal pressure variation of a combustor into a mathematical model, a safe region estimating unit 42 for obtaining a region where an NOx discharge amount is equal to or less than a restricting value and combustion vibration is less prone to be generated, a database 43 for storing plant data and weather data in a time series, inputting unit 44 for inputting a limiting value of the plant data, the weather data and the internal pressure variation and a restricting value of NOx, outputting unit 45 for outputting a safe region estimation result, and a NOx discharge amount characteristic grasping unit 46 for making the NOx discharge amount into a mathematical model. A plant 50 of a to-be estimated combustion vibration is connected to the inputting unit 44. A symbol 49 represents a connection portion for connecting the above means to each other (in other drawings also).

The internal pressure variation characteristic grasping unit 41 constructs a mathematical model which explains the internal pressure variation using data stored in the database 43. For example, if the number of combustor is $n_1$ and the number of frequency bands is $n_2$, the internal pressure variation estimated value is made into the multi-regression model as shown in the equation (1).

The internal pressure variation characteristic grasping unit 41 obtains coefficient parameters $a_{ij.0}$, $a_{ij.1}$, $a_{ij.2}$, $a_{ij.3}$, $a_{ij.4}$ of the equation (1) using internal pressure variation values, manipulated variables, quantity of non-manipulatable states organized and stored at time periods in the database 43, and sends these parameters to the safe region estimating unit 42. As a solution of the coefficient parameters, a method of least squares is used for example.

The term "internal pressure variation value" is explained below. Data obtained from a pressure sensor (internal pressure sensor) disposed in the plant 50 is A/D converted, a result of frequency analysis of the converted value is divided into $n_2$-number of frequency bands, and a maximum amplitude value for a certain time period in each frequency band is the internal pressure variation value. For the sake of explanation, a model formula is described based on that the number of manipulated variables is two and the quantity of non-manipulatable states is two, but the number is not limited to two.

The NOx discharge amount characteristic grasping unit 46 constructs a mathematical model which explains NOx discharge amount using data stored in the database 43. For example, the NOx discharge amount is made into a mathematical model with a multi-regression model shown in the following equation (6):

$$E = b_0 + b_1 \times X_{11} + b_2 \times X_{12} + b_3 \times X_{21} + b_4 \times X_{22} \qquad (6)$$

In equation (6),

E: NOx discharge amount $X_{11}$: value of manipulated variable 1

$X_{12}$: value of manipulated variable 2

$X_{21}$: value of quantity of non-manipulatable state 1

$X_{22}$: value of quantity of non-manipulatable state 2 $b_0$, $b_1$, $b_2$, $b_3$, $b_4$: coefficient parameter The NOx discharge amount characteristic grasping unit 46 obtains the coefficient parameters $b_0$, $b_1$, $b_2$, $b_3$, $b_4$ of the equation (6) using the NOx discharge amount, the manipulated variable, non-manipulatable states organized and stored at time periods in the database 43, and sends the same to the safe region estimating unit 42. As a solution of the coefficient parameters, a method of least squares is used for example.

For the sake of explanation, a model formula is described based on that the number of manipulated variables is two and the quantity of non-manipulatable states is two, but the number is not limited to two.

The safe region estimating unit 42 obtains a region where an NOx discharge amount is equal to or less than a restricting value and combustion vibration is less prone to be generated, using the mathematical models obtained by the internal pressure variation characteristic grasping unit 41 and the NOx discharge amount characteristic grasping unit 46.

For example, the estimated value $Y'_{ij}$ of an internal pressure variation of the j-th frequency band of the i-th combustor when the manipulated variable 1, the manipulated variable 2, the quantity of non-manipulatable state 1 and the quantity of non-manipulatable state 2 are $X'_{11}$, $X'_{12}$, $X'_{21}$ and $X'_{22}$, respectively, is obtained by the equation (2). At that time, the $a_{ij.0}$, $a_{ij.1}$, $a_{ij.2}$, $a_{ij.3}$, $a_{ij.4}$ are coefficient parameters sent from the internal pressure variation characteristic grasping unit 41.

In the internal pressure variation of the j-th frequency band of the i-th combustor, a limiting value is provided for a structural reason of the combustor or peripheral equipment. If the limiting value of internal pressure variation of the f-th frequency band of the i-th combustor sent from the inputting unit 44 is defined as $Z_{ij}$, this means that there exist $X'_{11}$, $X'_{12}$, $X'_{21}$, $X'_{22}$ which satisfied the equation (3).

Figure 7:
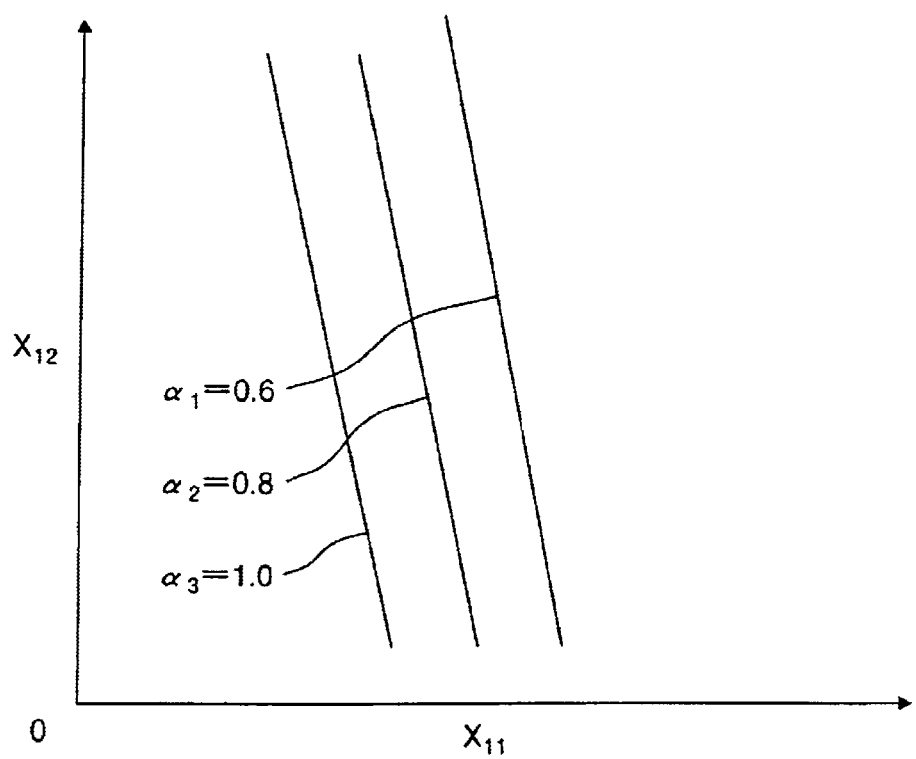
FIG. 7 is a principle view of an estimation method of a safe region in the combustion vibration region according to the third embodiment of the invention.

If values of the quantity of non-manipulatable state 1 and the quantity of non-manipulatable state 2 are input in the inputting unit 44 and these input values are sent to the safe region estimating unit 42, every value in the equation (3) except $X'_{11}$ and $X'12$ is a constant, and it is easy to obtain the ($X'_{11}$, and $X'_{12}$) which satisfy the equation (3) . If the ($X'_{11}$, $X'_{12}$) are obtained from the equation (4) using the gain which is gainαk(k=1, . . . , $n_3$) sent from the inputting unit 44, n-number of lines can be obtained in every frequency band. FIG. 7 shows this. If the coefficient parameter $a_{ij.2}$ is positive, an upper side of the straight line is a combustion vibration-prone to be generated region and a lower side is a combustion vibration-less prone to be generated region. If the coefficient parameter $a_{ij.2}$ is negative on the contrary, the lower side of the straight line is the combustion vibration-prone to be generated region, and the upper side is the combustion vibration-less prone to be generated region.

Figure 8:
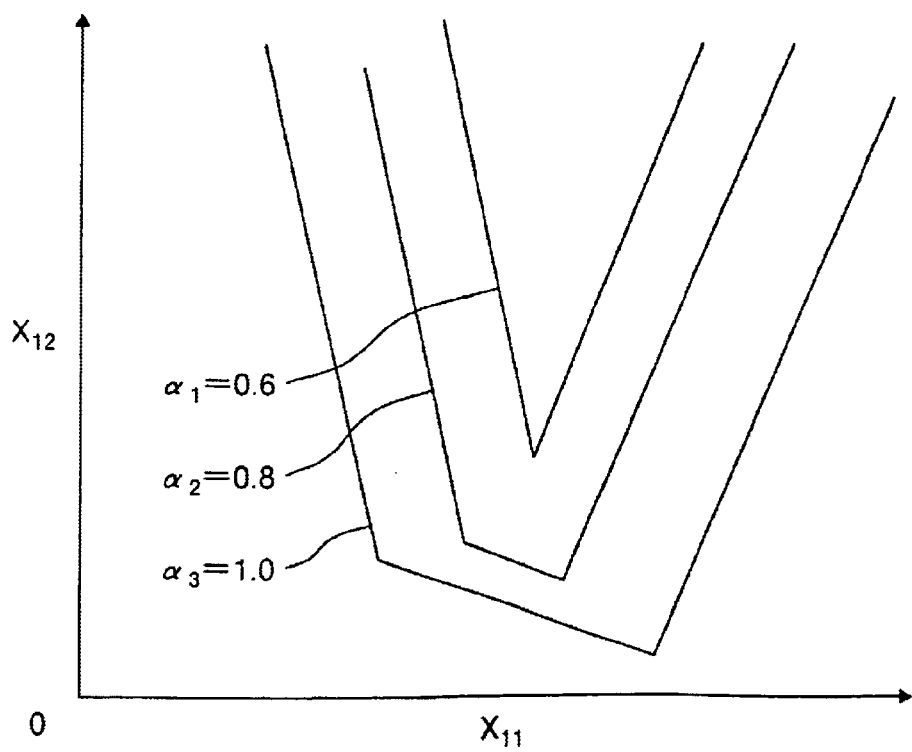
FIG. 8 is a principle view of an estimation method of the safe region in the combustion vibration estimating apparatus according to the third embodiment of the invention.

The safe region estimating unit 42 obtains the above-described straight lines for full frequency bands of all the combustors from limiting values $Z_{ij}$ (i=1, . . . , $n_1$, j=1, . . . , $n_2$), gainαk(k=1, . . . , $n_3$) and values of variables except of the j-th frequency band of the i-th combustor sent from the inputting unit 44, and from coefficient parameter $a_{ij.0}$, $a_{ij.1}$, $a_{ij.2}$, $a_{ij.3}$, $a_{ij.4}$ (i=1, . . . , $n_1$, j=1, . . . , $n_2$) sent from the internal pressure variation characteristic grasping unit 41, and finally obtains combustion vibration-prone to be generated region and combustion vibration-less prone to be generated region based on the procedure of linear programming. FIG. 8 shows this.

Further, the safe region estimating unit 42 obtains an NOx-less-prone to be generated region and an NOx-prone to be generated region from the coefficient parameters $b_0$, $b_1$, $b_2$, $b_3$, $b_4$ sent from the NOx discharge amount characteristic grasping unit 46 and a restricting value F, a gain βk (k=1, . . . , $n_3$) and variables except particular two variables. FIG. 9 shows this. Here, if the coefficient parameter $b_2$ is positive, an upper side of the straight line is a NOx-prone to be generated region and a lower side is a NOx-less prone to be generated region. If the coefficient parameter $b_2$ is negative on the contrary, the lower side of the straight line is the NOx-prone to be generated region, and the upper side is the NOx-less prone to be generated region.

The safe region estimating unit 42 obtains and transmits to the outputting unit 45 a region where the NOx discharge amount is equal to or less than the restricting value and the combustion vibration is less prone to be generated based on procedure of linear programming, for the combustion vibration-less prone to be generated region, the combustion vibration-prone to be generated region, the NOx-prone to be generated region and the NOx-less-prone to be generated region. FIG. 10 shows this.

In the database 43, the internal pressure variation values, manipulated variables, quantity of non-manipulatable state are organized and stored in the time series at time periods, and if the data is sent from the inputting unit 44, the data is additionally stored in the database 43.

The inputting unit 44 receives the plant data and weather data sent from the plant 50 outside the combustion vibration estimating apparatus 40, and sends the same to the database 43. The plant data and weather data include the internal pressure variation values, manipulated variables and quantity of non-manipulatable state. From a device such as a keyboard or a touch screen provided in the inputting unit 44, limiting values $Z_{ij}$ (i=1, . . . , $n_1$, j=1, . . . , $n_2$) , the restricting value F of the NOx discharge amount, gains αk, βk (k=1, . . . , $n_3$) and values of variables except particular two variables of the j-th frequency band of the i-th combustor are input, and these are sent to the safe region estimating unit 42.

Figure 11:
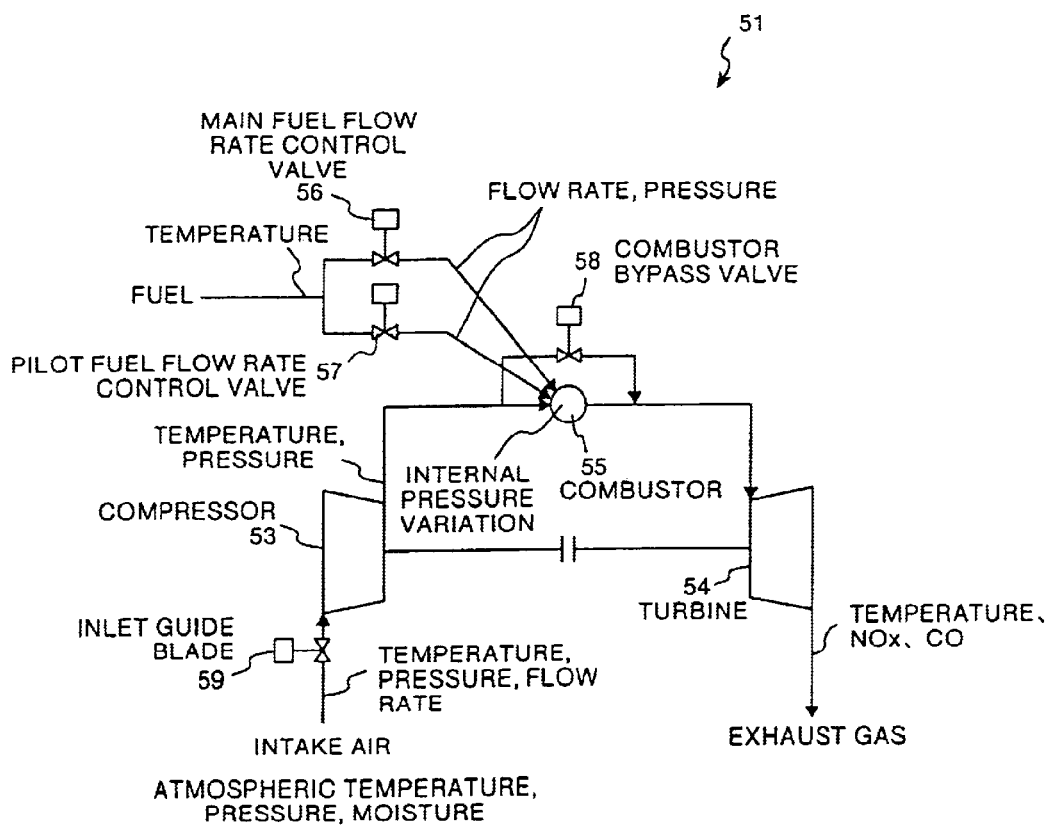
FIG. 11 is a block diagram schematically showing one example of a structure of a gas turbine system to which the invention can be applied.

For example, in a gas turbine 51, the plant data includes, in addition to the internal pressure variation value and the NOx discharge amount, an intake air temperature, an intake air pressure, an intake air flow rate, a temperature of outlet of a compressor, pressure of the outlet of the compressor, a fuel flow rate, a fuel temperature, a fuel pressure, a temperature of exhaust gas, angle of an inlet guide blade, an opening of a combustor bypass valve, an opening of a fuel flow rate control valve. There exist fuel flow rate, fuel pressure and fuel flow rate control valve which are for main flame mainly used for combustion, and fuel flow rate, fuel pressure and fuel flow rate control valve which are for pilot flame used for holding the main flame. The weather data includes an atmosphere temperature, atmospheric pressure, and moisture. The manipulated variable and the quantity of non-manipulatable state used for the multi-regression model are selected from the weather data. In FIG. 11, a symbol 53 represents a compressor, a symbol 54 represents a turbine, a symbol 55 represents a combustor, a symbol 56 represents a main fuel flow rate control valve, a symbol 57 represents a pilot fuel flow rate control valve, a symbol 58 represents a combustor bypass valve, and a symbol 59 represents an inlet guide blade.

The outputting unit 45 outputs an estimation result sent from the safe region estimating unit 42. FIG. 10 shows an example of output in which a safe region is output. In FIG. 10, the horizontal axis is $X_{11}$ and the vertical axis is $X_{12}$. In this example, the safe regions are shown like contour lines per each gain αk and βk. A central portion is the combustion vibration-less prone to be generated region and outer portion is combustion vibration-prone to be generated region. The region is output to a display device such as a CRT or a printer provided in the outputting unit 45.

Figure 12:
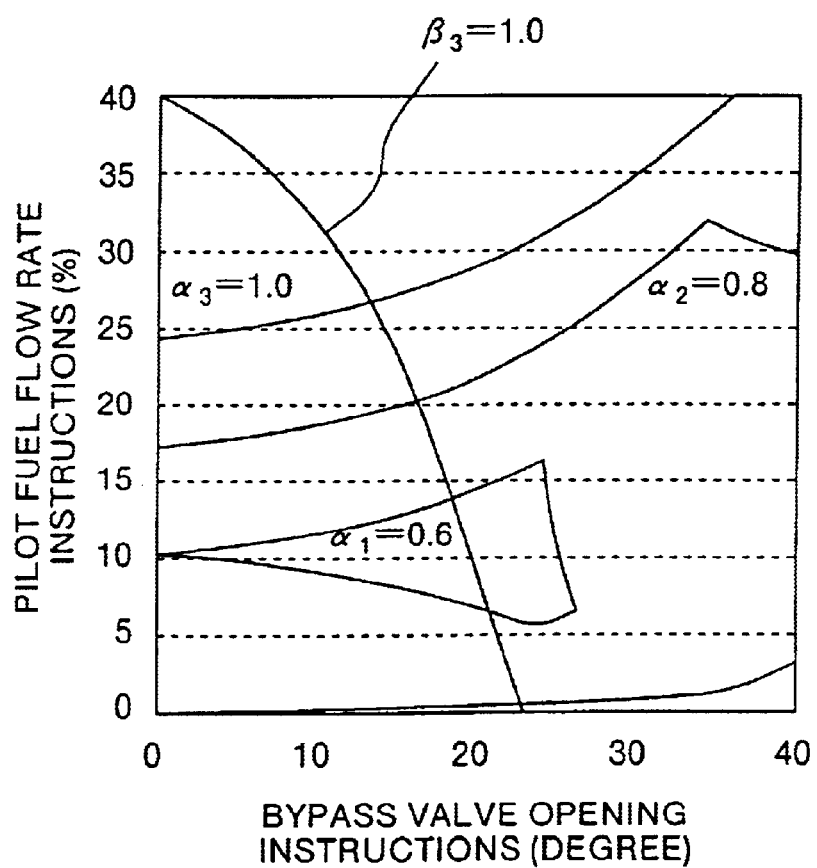
FIG. 12 is a graph showing a concrete application example of the combustion vibration estimating apparatus according to the third embodiment of the invention.

As explained above, according to this combustion vibration estimating apparatus 40, combustion vibration and the NOx discharge amount generated in a combustor of a gas turbine are estimated by the mathematical model, and based on this, the combustion control system can easily be controlled, the breakage of facilities can be avoided, the utilization ratio of facilities can be enhanced, and safety can also be enhanced. Therefore, if the combustion vibration estimating apparatus 40 is used, a safe region where the NOx discharge amount is equal to or less than the restricting value and the combustion vibration is less prone to be generated is suggested for a combustion control parameter of a gas turbine which was conventionally adjusted based on experience of a skilled adjusting operator. Therefore, for example, it is possible to shorten the field adjusting period, and even a person who is not skilled can carry out the field adjustment easily. FIG. 12 concretely shows one example of an output result that can be applied to adjustment of a combustion control system of a gas turbine.

Although the plant data and weather data are input from the plant 50 in the above embodiment, the data may be input directly manually from a keyboard provided in the inputting unit 44. The model structure is described as being one liner order, but it may be a higher-order model of two orders or more. The model formula is described as being formula using manipulated variable or quantity of non-manipulatable state input from the plant 50, but a value converted based on physical characteristics may be used.

Figure 13:
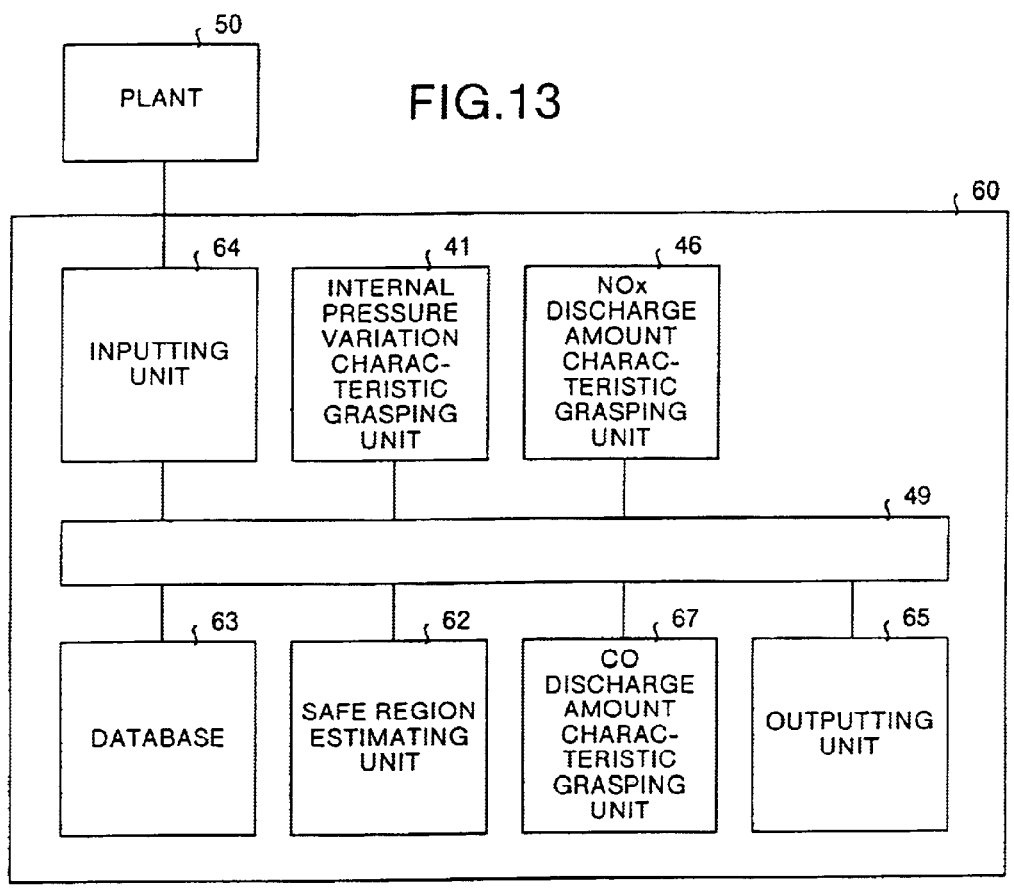
FIG. 13 is a block diagram of the combustion vibration estimating apparatus according to a forth embodiment of the present invention.

FIG. 13 shows a structure of a forth embodiment of the combustion vibration estimating apparatus of the present invention. In FIG. 13, a symbol 60 represents the entire combustion vibration estimating apparatus. The combustion vibration estimating apparatus 60 comprises an internal pressure variation characteristic grasping unit 41 for making an internal pressure variation of a combustor into a mathematical model, a safe region estimating unit 62 for obtaining a region where an NOx discharge amount and a CO discharge amount are equal to or less than a restricting value and combustion vibration is less prone to be generated, a database 63 for storing plant data and weather data in a time series, inputting unit 64 for inputting a limiting value of the plant data, the weather data and the internal pressure variation and a restricting values of NOx and CO, outputting unit 65 for outputting a safe region estimation result, a NOx discharge amount characteristic grasping unit 46 for making the NOx discharge amount into a mathematical model, and a CO discharge amount characteristic grasping unit 67 for making the CO discharge amount into a mathematical model. A plant 50 of a to-be estimated combustion vibration is connected to the inputting unit 64.

The internal pressure variation characteristic grasping unit 41 and the NOx discharge amount characteristic grasping unit 46 are the same as those in the third embodiment. A redundancy explanation will be omitted, and only a portion different from the third embodiment will be explained.

The CO discharge amount characteristic grasping unit 67 constructs a mathematical model which explains a CO discharge amount using data stored in the database 63. For example, the CO discharge amount is made into a model with a multi-regression model expressed by the following equation (7):

$$G = C_0 + c_1 \times X_{11} + c_2 \times X_{12} + c_3 \times X_{21} + c_4 \times X_{22} \quad (7)$$

In equation (7),
G: CO discharge amount
$X_{11}$: value of manipulated variable 1
$X_{12}$: value of manipulated variable 2
$X_{21}$: value of quantity of non-manipulatable state 1
$X_{22}$: value of quantity of non-manipulatable state 2
$c_0, c_1, c_2, c_3, c_4$: coefficient parameter The CO discharge amount characteristic grasping unit 67 obtains the $c_0$, $C_1, c_2, c_3$ and $c_4$, using the CO discharge amount, the manipulated variable and quantity of non-manipulatable state organized and stored into the database 63 in the time series at time periods, and sends the same to the safe region estimating unit 62. As a solution of the coefficient parameters, a method of least squares is used for example.

For the sake of explanation, a model formula is described based on that the number of manipulated variables is two and the quantity of non-manipulatable states is two, but the number is not limited to two.

The safe region estimating unit 62 obtains a region where both the NOx discharge amount and CO discharge amount are equal to or less than the restricting value and the combustion vibration is less prone to be generated, using mathematical models obtained by the internal pressure variation characteristic grasping unit 41, the NOx discharge amount characteristic grasping unit 46 and the CO discharge amount characteristic grasping unit 67.

The methods for obtaining the combustion vibration-less prone to be generated region, the combustion vibration-prone to be generated region, the NOx-less-prone to be generated region and the NOx-prone to be generated region are the same as those of the third embodiment. Therefore, methods for obtaining the combustion vibration-less prone to be generated region and the combustion vibration-prone to be generated region will be explained below.

Like the procedure of the combustion vibration and NOx, the safe region estimating unit 62 obtains the combustion vibration-less prone to be generated region and the combustion vibration-prone to be generated region from a restricting value H of the CO discharge amount, gain γk (k=1, . . . , $n_3$) and particular two variables sent from the inputting unit 64, and from the coefficient parameters $c_0, c_1, c_2, c_3$ and $c_4$ sent from the CO discharge amount characteristic grasping unit 67.

Figure 14:
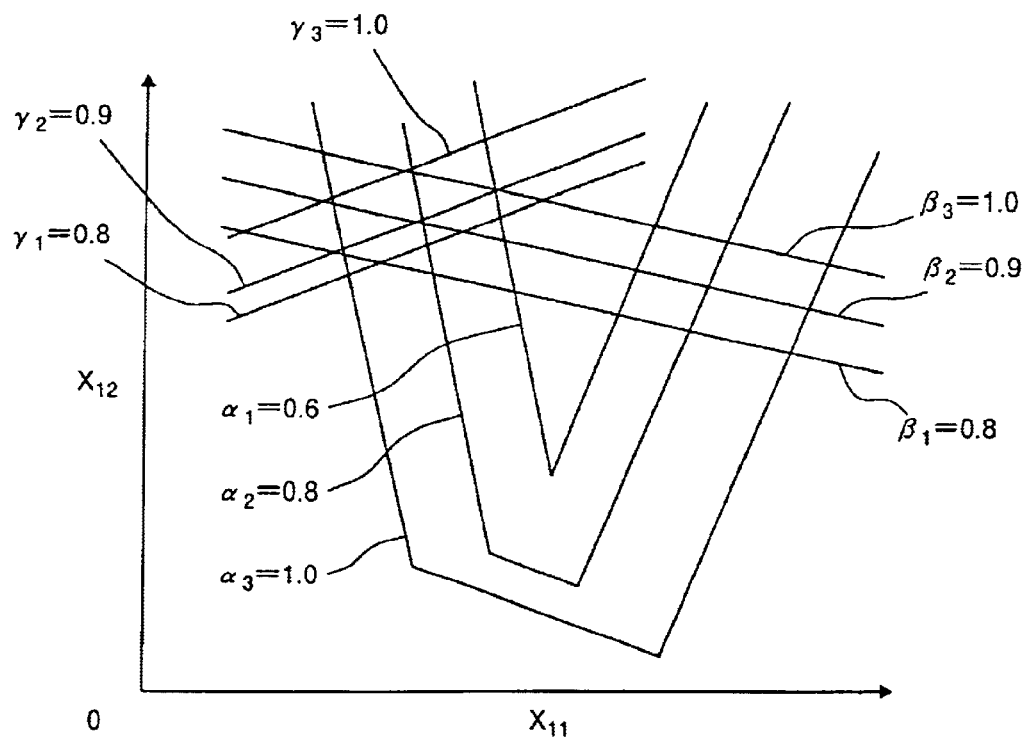
FIG. 14 is a graph showing an example of output of the safe region in the combustion vibration estimating apparatus according to the forth embodiment of the invention.

The safe region estimating unit 62 obtains a region where both the NOx discharge amount and CO discharge amount are equal to or less than the restricting value and the combustion vibration is less prone to be generated based on the procedure of linear programming, for the combustion vibration-less-prone to be generated region, the combustion vibration-pone to be generated region, the NOx-less-prone to be generated region, the NOx-prone to be generated region, the CO-less-prone to be generated region and the CO-prone to be generated region, and sends the same to the outputting unit 65. FIG. 14 shows this. In FIG. 14, if the coefficient parameter $c_2$ is positive, an upper side of the straight line is a CO-prone to be generated region and a lower side is a CO-less prone to be generated region. If the coefficient parameter $c_2$ is negative on the contrary, the lower side of the straight line is the CO-prone to be generated region, and the upper side is the CO-less prone to be generated region.

In the database 63, the internal pressure variation values, manipulated variables, the NOx discharge amount, the CO discharge amount, the manipulated variable and the quantity of non-manipulatable state are organized and stored in the time series at time periods, and if the data is sent from the inputting unit 64, the data is additionally stored in the database 63.

The inputting unit 64 receives the plant data and weather data sent from the plant 50 outside the combustion vibration estimating apparatus 60, and sends the same to the database 63. From a device such as a keyboard or a touch screen provided in the inputting unit 64, limiting values $Z_{ij}$ (i=1, . . . , $n_1$, j=1, . . . , $n_2$), the restricting value F of the NOx discharge amount, the restricting value H of the CO discharge amount, gains αk, βk (k=1, . . . , $n_3$) and values of variables except particular two variables of the j-th frequency band of the i-th combustor are input, and these are sent to the safe region estimating unit 62. The plant data and weather data include the internal pressure variation value, the NOx discharge amount, the CO discharge amount, the manipulated variable and the quantity of non-manipulatable state. For example, in the third embodiment, the plant data and weather data are the various data explained in association with FIG. 11 to which the CO discharge amount is added.

The outputting unit 65 outputs an estimation result sent from the safe region estimating unit 62. FIG. 14 shows an example of output in which a safe region is output. In FIG. 14, the horizontal axis is $X_{11}$ and the vertical axis is $X_{12}$. In this example, the safe regions are shown like contour lines per each gain αk, βk, γk. A central portion is the combustion vibration-less prone to be generated region and outer portion is combustion vibration-prone to be generated region. The region is output to a display device such as a CRT or a printer provided in the outputting unit 65.

As explained above, according to this combustion vibration estimating apparatus 60, combustion vibration, the NOx discharge amount and the CO discharge amount generated in a combustor of a gas turbine are estimated by the mathematical model, and based on this, the combustion control system can easily be controlled, the breakage of facilities can be avoided, the utilization ratio of facilities can be enhanced, and safety can also be enhanced. Therefore, if the combustion vibration estimating apparatus 60 is used, a safe region where the NOx discharge amount and the CO discharge amount are equal to or less than the restricting values and the combustion vibration is less prone to be generated is suggested for a combustion control parameter of a gas turbine which was conventionally adjusted based on experience of a skilled adjusting operator. Therefore, for example, it is possible to shorten the field adjusting period, and even a person who is not skilled can carry out the field adjustment easily.

Although the plant data and weather data are input from the plant 50 in the above embodiment, the data may be input directly manually from a keyboard provided in the inputting unit 64. The model structure is described as being one liner order, but it may be a higher-order model of two orders or more. The model formula is described as being formula using manipulated variable or quantity of non-manipulatable state input from the plant 50, but a value converted based on physical characteristics may be used.

Figure 15:
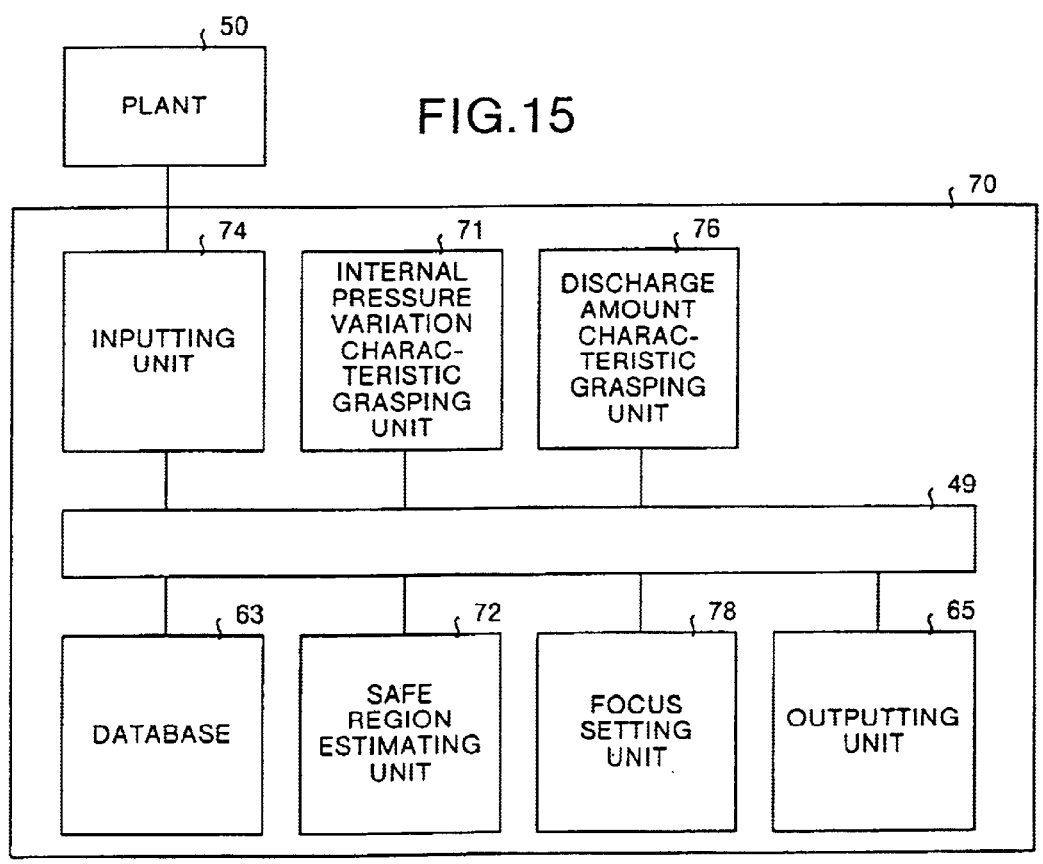
FIG. 15 is a block diagram of the combustion vibration estimating apparatus according to a fifth embodiment of the invention.

FIG. 15 shows a structure of a fifth embodiment of the combustion vibration estimating apparatus of the present invention. In FIG. 15, a symbol 70 represents the entire combustion vibration estimating apparatus. The combustion vibration estimating apparatus 70 comprises an internal pressure variation characteristic grasping unit 71 for making an internal pressure variation of a combustor into a mathematical model, a safe region estimating unit 72 for obtaining a region where an NOx discharge amount and a CO discharge amount are equal to or less than a restricting value and combustion vibration is less prone to be generated, a database 63 for storing plant data and weather data in a time series, inputting unit 74 for inputting a limiting value of the plant data, the weather data and the internal pressure variation and a restricting values of NOx and CO, outputting unit.65 for outputting a safe region estimation result, a NOx discharge amount characteristic grasping unit 76 for making the NOx discharge amount into a mathematical model, and focus setting unit 78 for selecting data used for mathematical model. A plant 50 of a to-be estimated combustion vibration is connected to the inputting unit 74.

The internal pressure variation characteristic grasping unit 71 has a function for selecting a database used for making data into mathematical model, based on a selection result described in a certain area of the database 63. Since the other structure and function and the like of the internal pressure variation characteristic grasping unit 71 are the same as those of the internal pressure variation characteristic grasping unit 41 of the third embodiment, redundant explanation will be omitted.

The discharge amount characteristic grasping unit 76 has a function for selecting a database used for making data into mathematical model, based on a selection result described in a certain area of the database 63. Since the other structure and function and the like of the discharge amount characteristic grasping unit 76 are the same as those of the NOx discharge amount characteristic grasping unit 46 in the third embodiment and the CO discharge amount characteristic grasping unit 67 in the forth embodiment, redundant explanation will be omitted.

The safe region estimating unit 72 obtains a region where both the NOx discharge amount and the CO discharge amount are equal to or less than the restricting values and the combustion vibration is less prone to be generated, using mathematical models obtained by the internal pressure variation characteristic grasping unit 71 and the discharge amount characteristic grasping unit 76.

Methods for obtaining the combustion vibration-less-prone to be generated region, the combustion vibration-pone to be generated region, the NOx-less-prone to be generated region, the NOx-prone to be generated region, the CO-less-prone to be generated region and the CO-prone to be generated region are the same as those of the forth embodiment, redundant explanation will be omitted.

The focus setting unit 78 selects data from data stored in the database 63 which corresponds to the focus setting information input from the inputting unit 74, and describes the selection result in a certain memory in the database 63. Here, the focus setting information is not specially limited, but is information such as upper limit values, lower limit values of the various variables, a center of the selection range and a maximum distance from the center.

The inputting unit 74 inputs the focus setting information for selecting data used for making a mathematical model from a device such as a keyboard and a touch screen provided in the inputting unit to transmit to the focus setting unit 78. Other structure, function and the like of the inputting unit 74 are the same as those of the inputting unit 64 in the forth embodiment except that the various data input from the device such as the keyboard and the touch screen is sent to the safe region estimating unit 72 (safe region estimating unit 62 in the forth embodiment) Therefore, redundant explanation will be omitted. The plant data and weather data are also the same as those of the forth embodiment.

Figure 16:
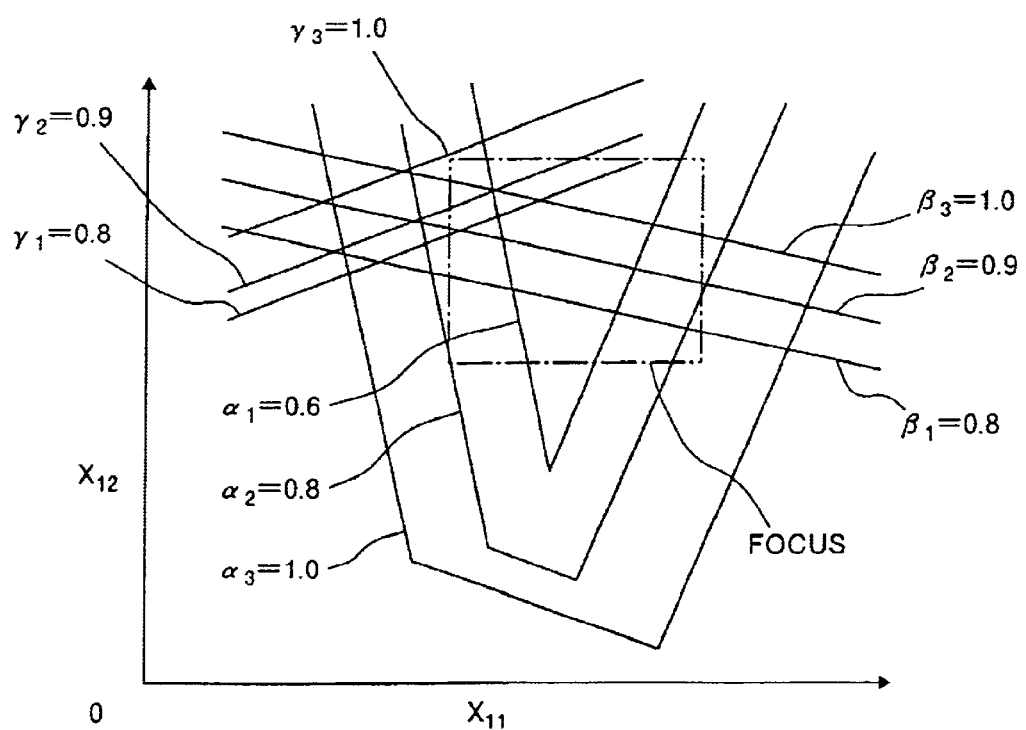
FIG. 16 is a graph showing an example of output of the safe region in the combustion vibration estimating apparatus according to the fifth embodiment of the invention.

The outputting unit 65 is the same as that of the forth embodiment except that the estimation result is supplied to the safe region estimating unit 72 (safe region estimating unit 62 in the forth embodiment). Therefore, redundant explanation will be omitted. FIG. 16 shows an example of output in which a safe region is output. In FIG. 16, the horizontal axis is $X_{11}$, and the vertical axis is $X_{12}$. In this example, the safe regions are shown like contour lines per each gain αk, αPk, γk. A central portion is the combustion vibration-less prone to be generated region and outer portion is combustion vibration-prone to be generated region.

As explained above, according to this combustion vibration estimating apparatus 70, the combustion vibration, the NOx discharge amount and the CO discharge amount generated in the combustor of the gas turbine are estimated, the safe region where the combustion vibration is less prone to be generated can widely be obtained macroscopically and can be obtained with high precision macroscopically. Therefore, it is easy to grasp the combustion vibration characteristics. Further, by grasping the combustion vibration characteristics, the combustion control system can be adjusted easily, the breakage of facilities can be avoided, the utilization ratio of facilities can be enhanced, and safety can also be enhanced. For example, if the combustion vibration estimating apparatus 70 is used, a safe region where the NOx discharge amount and the CO discharge amount are equal to or less than the restricting values and the combustion vibration is less prone to be generated is suggested for a combustion control parameter of a gas turbine which was conventionally adjusted based on experience of a skilled adjusting operator. Therefore, for example, it is possible to shorten the field adjusting period, and even a person who is not skilled can carry out the field adjustment easily.

Although the plant data and weather data are input from the plant 50 in the above embodiment, the data may be input directly manually from a keyboard provided in the inputting unit 74. The model structure is described as being one liner order, but it may be a higher-order model of two orders or more. The model formula is described as being formula using manipulated variable or quantity of non-manipulatable state input from the plant 50, but a value converted based on physical characteristics may be used.

Figure 17:
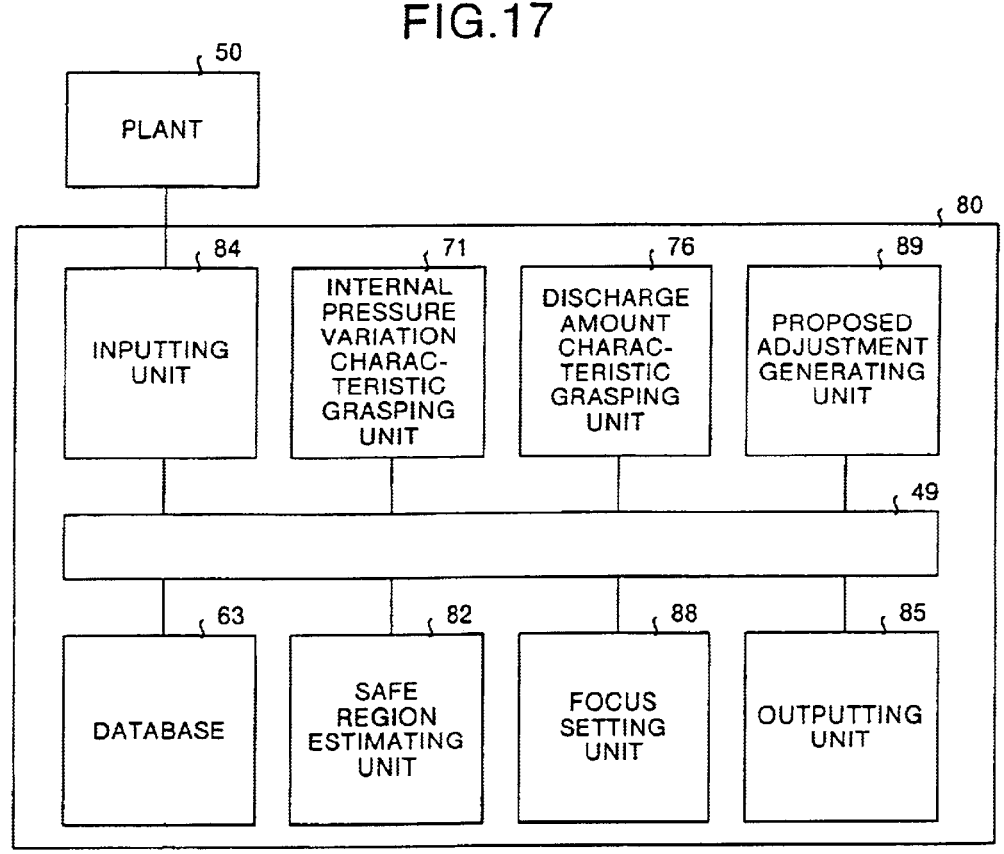
FIG. 17 is a block diagram of the combustion vibration estimating apparatus according to a sixth embodiment of the invention.

FIG. 17 shows a structure of a sixth embodiment of the combustion vibration estimating apparatus of the present invention. In FIG. 17, a symbol 80 represents the entire combustion vibration estimating apparatus. The combustion vibration estimating apparatus 80 comprises an internal pressure variation characteristic grasping unit 71 for making an internal pressure variation of a combustor into a mathematical model, a safe region estimating unit 82 for obtaining a region where an NOx discharge amount and a CO discharge amount are equal to or less than a restricting value and combustion vibration is less prone to be generated, a database 63 for storing plant data and weather data in a time series, inputting unit 84 for inputting a limiting value of the plant data, the weather data and the internal pressure variation and a restricting values of NOx and CO, outputting unit 85 for outputting a safe region estimation result and data used for making a mathematical model, a NOx discharge amount characteristic grasping unit 76 for making the NOx discharge amount into a mathematical model, focus setting unit 88 for selecting data used for mathematical model, and proposed adjustment generating unit 89 for obtaining a point to be measured next using a safe region estimation result. A plant 50 of a to-be estimated combustion vibration is connected to the inputting unit 84.

Since the internal pressure variation characteristic grasping unit 71 and the discharge amount characteristic grasping unit 76 are the same as those of the fifth embodiment, redundant explanation will be omitted.

The safe region estimating unit 82 obtains an estimated optimal point where both the NOx discharge amount and CO discharge amount are equal to or less than the restricting values and a level of generation of the combustion vibration is the smallest, and sends the estimated optimal point to the focus setting unit 88 and the outputting unit 85. Other structure, function and the like of the safe region estimating unit 82 are the same as those of the safe region estimating unit 72 in the fifth embodiment, redundant explanation will be omitted.

Methods for obtaining the combustion vibration-less-prone to be generated region, the combustion vibration-pone to be generated region, the NOx-less-prone to be generated region, the NOx-prone to be generated region, the CO-less-prone to be generated region and the CO-prone to be generated region are the same as those of the forth embodiment, redundant explanation will be omitted.

At an initial stage of adjustment, the focus setting unit 88 selects data from data stored in the database 63 which corresponds to initial focus setting information input from the inputting unit 84, and describes the selection result in a certain memory in the database 63. Here, the focus setting information is not specially limited, but is information such as upper limit values, lower limit values of the various variables, and coordinates of a center of the focus.

Figure 18:
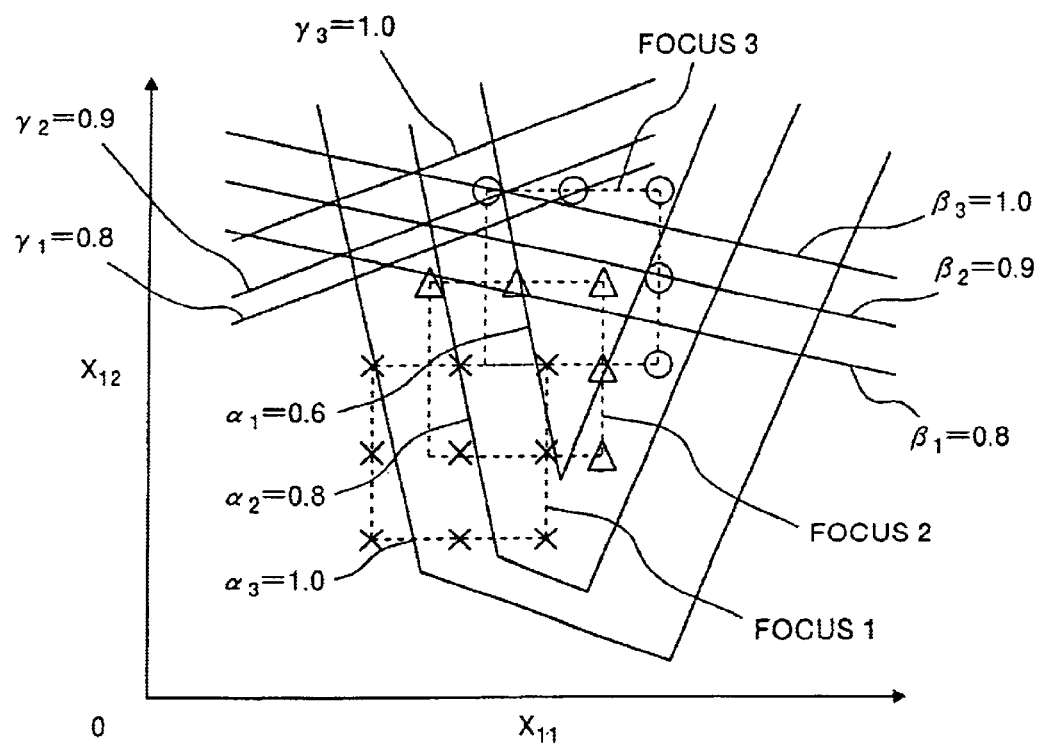
FIG. 18 is a graph showing an example of output of the safe region in the combustion vibration estimating apparatus according to the sixth embodiment of the invention.
Figure 19:
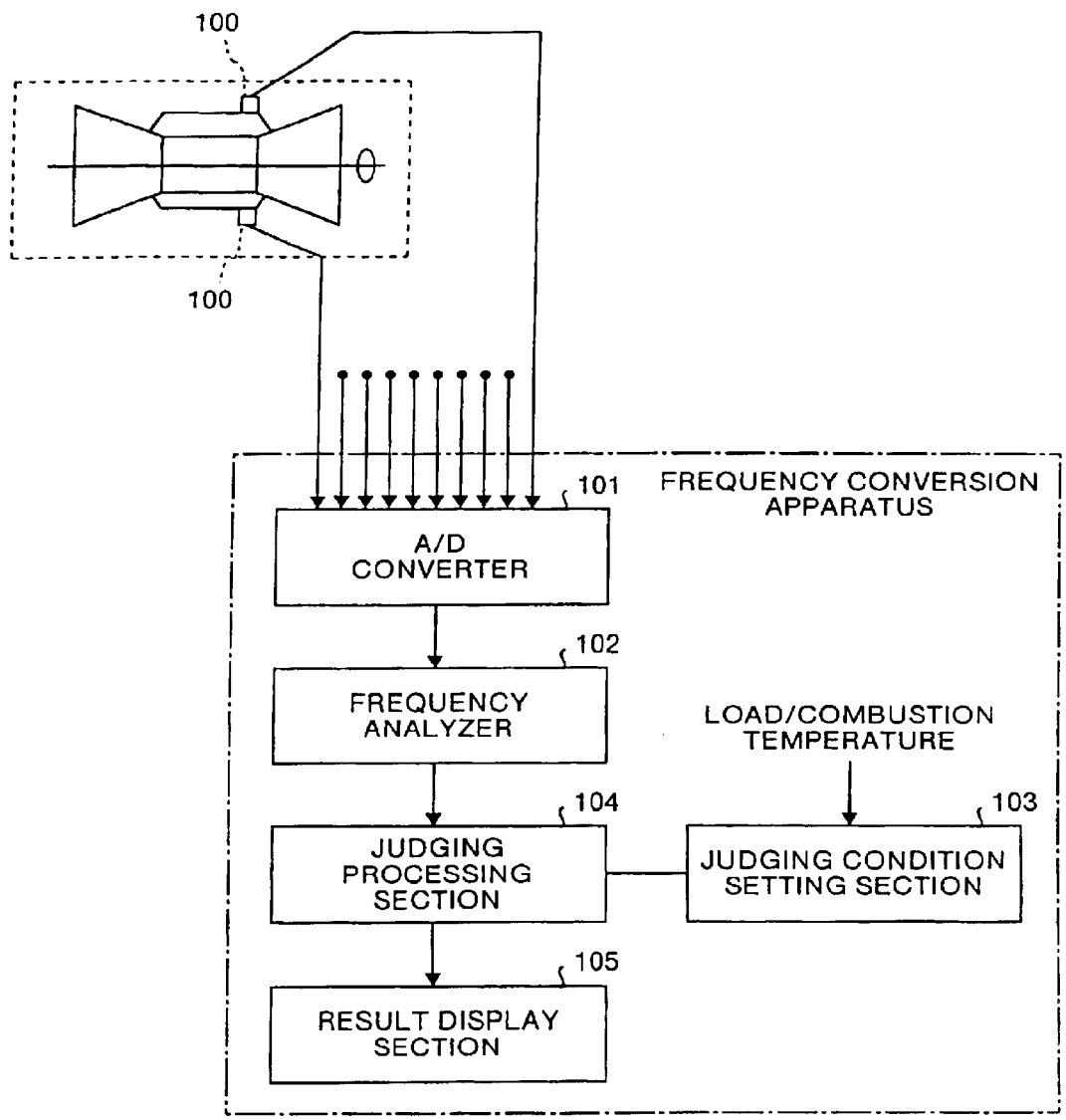
FIG. 19 is a block diagram showing prior art.

The focus setting unit 88 changes the initial focus setting information based on the estimated optimal point obtained by the safe region estimating unit 82. The changed focus setting information is defined as new focus setting information. The focus setting unit 88 changes the existing focus setting information based on the estimated optimal point obtained by the safe region estimating unit 82, and changed focus setting information is defined as new focus setting information. The focus setting unit 88 selects data from data stored in the database 63 which corresponds to the changed focus setting information, and describes the selection result in a certain memory in the database 63. If the estimated optimal point is located outside of the current focus, the focus is moved toward the estimated optimal point. Even if the estimated optimal point is located inside the focus, if its location is near the periphery of the focus, the location of the focus is again set by moving the focus slightly. FIG. 18 shows one example of the movement of the focus. In this example, the focuses are moved while partially superposing on one another, but the movement is not limited to this.

The proposed adjustment generating unit 89 searches, in a focus which was newly set by the focus setting unit 88, points where measurement of data of the turbine is insufficient, and sends the insufficient point as a point to be additionally measured to the outputting unit 85. FIG. 18 shows this. For example, assume that the current focus is set in an area of a focus 1 in FIG. 18, data of point shown with x was already measured, and the estimated optimal point is located in an upper right direction in FIG. 18. In this case, the focus moves toward the estimated optimal point (upper right direction in FIG. 18, an area located in the upper right direction in FIG. 18 from the focus 1 is newly determined as a focus 2. At that time, the proposed adjustment generating unit 89 proposes to measure data of points shown with Δ which are newly included in the focus 2.

The inputting unit 84 inputs initial focus setting information for selecting data used for making a mathematical model from the device such as the keyboard and the touch screen provided in the inputting unit, and sends the information to the focus setting unit 88. Other structure, function and the like of the inputting unit 84 are the same as those of the inputting unit 64 in the forth embodiment except that the various data input from the device such as the keyboard and the touch screen is sent to the safe region estimating unit 82 (safe region estimating unit 62 in the forth embodiment), redundant explanation will be omitted. The plant data and weather data are also the same as those of the forth embodiment.

The outputting unit 85 outputs, to a CRT or a printer provided in the outputting unit 85, an estimation result sent from the safe region estimating unit 82, a focus area set by the focus setting unit 88 and a measuring point sent from the proposed adjustment generating unit 89. In this example, the safe regions are shown like contour lines per each gain αk, βk, γk. A central portion is the combustion vibration-less prone to be generated region and outer portion is combustion vibration-prone to be generated region. In FIG. 18, rectangular regions shown with the focuses 1, 2 and 3 show that the focuses move sequentially. The symbol x represents a point where data was already measure, and symbols Δ and ○ show proposed points where data should additionally be measured in the focuses 2 and 3, respectively.

As explained above, according to this combustion vibration estimating apparatus 80, the combustion vibration, the NOx discharge amount and the CO discharge amount generated in the combustor of the gas turbine are estimated, the safe region where the combustion vibration is less prone to be generated is obtained with high precision, and a new measuring point is proposed for searching safer driving point. Therefore, it is possible to obtain a point where the NOx discharge amount and the CO discharge amount are equal to or less than the restricting values and the combustion vibration is least prone to be generated, i.e., the optimal driving point. Therefore, the combustion control system can be adjusted easily, and the adjustment can be carried out within a shorter as compared with the conventional method. Further, the breakage of facilities can be avoided, the utilization ratio of facilities can be enhanced, and safety can also be enhanced. For example, if the combustion vibration estimating apparatus 80 is used, a safe region where the NOx discharge amount and the CO discharge amount are equal to or less than the restricting values and the combustion vibration is less prone to be generated is suggested for a combustion control parameter of a gas turbine which was conventionally adjusted based on experience of a skilled adjusting operator. Therefore, for example, it is possible to shorten the field adjusting period, and even a person who is not skilled can carry out the field adjustment easily.

Although the plant data and weather data are input from the plant 50 in the above embodiment, the data may be input directly manually from a keyboard provided in the inputting unit 84. The model structure is described as being one liner order, but it may be a higher-order model of two orders or more. The model formula is described as being formula using manipulated variable or quantity of non-manipulatable state input from the plant 50, but a value converted based on physical characteristics may be used.

As explained above, according to the combustion vibration estimating apparatus of the present invention, the combustion vibration-prone to be generated region and the combustion vibration-less prone to be generated region are obtained based on the mathematical model constructed from the plant data and weather data, and a result thereof is output. Therefore, adjustment the combustion control system can be facilitated, the breakage of facilities can be avoided, the utilization ratio of facilities can be enhanced, and safety can also be enhanced.

According to the combustion vibration estimating apparatus of the present invention, the internal pressure variation characteristic grasping unit makes the internal pressure variation of the combustor into the mathematical model from the plant data and weather data input by the inputting unit, the combustion vibration region estimating unit applies the limiting value of the internal pressure variation to the mathematical model to obtain the combustion-prone to be generated region, and the combustion vibration region estimation result is output from the outputting unit. Therefore, adjustment the combustion control system can be facilitated, the breakage of facilities can be avoided, the utilization ratio of facilities can be enhanced, and safety can also be enhanced.

Moreover, the plant data and the weather data input by the inputting unit are stored into a time series, the internal pressure variation characteristic grasping unit obtains data from the database to make the internal pressure variation of the combustor into the mathematical model. Therefore, a region where the combustion vibration is prone to be generated is obtained more reliably.

According to the combustion vibration estimating apparatus of the present invention, the internal pressure variation estimating unit estimates the internal pressure variation of the combustor by the plant data and weather data input by the inputting unit, and the estimated internal pressure variation estimation result is output from the outputting unit.

There fore, it is possible to judge whether the internal pressure variation of the gas turbine combustor is at a level as planned, generation of the combustion vibration can be detected at an early stage, the breakage of facilities can be avoided, the utilization ratio of facilities can be enhanced, and safety can also be enhanced.

Moreover, the plant data and weather data input by the inputting unit are stored in the time series, the internal pressure variation estimating unit estimates the estimated value of the internal pressure variation of the latest data stored in the database. Therefore, the internal pressure variation is estimated reliably.

According to the combustion vibration estimating apparatus of the present invention, the combustion vibration-less prone to be generated region and combustion vibration-prone to be generated region are obtained based on the mathematical model which explains internal pressure variation and NOx discharge amount constructed from the plant data and weather data. Therefore, adjustment the combustion control system can be facilitated, the breakage of facilities can be avoided, the utilization ratio of facilities can be enhanced, and safety can also be enhanced.

According to the combustion vibration estimating apparatus of the present invention, the internal pressure variation characteristic grasping unit makes the internal pressure variation of the combustor into the mathematical model from the plant data and weather data input from the inputting unit, the NOx discharge amount characteristic grasping unit makes the NOx discharge amount into the mathematical model from the plant data and weather data input by the inputting unit, the safe region estimating unit applies the limiting value of the internal pressure variation and the restricting value of the NOx to the mathematical model to obtain the combustion vibration-less prone to be generated region, and the safe region estimation result is output from the outputting unit. Therefore, adjustment the combustion control system can be facilitated, the breakage of facilities can be avoided, the utilization ratio of facilities can be enhanced, and safety can also be enhanced.

According to the combustion vibration estimating apparatus of the present invention, the combustion vibration-less prone to be generated region and combustion vibration-prone to be generated region are obtained based on the mathematical model which explains the internal pressure variation, NOx discharge amount and the CO discharge amount constructed from the plant data and weather data, and a result thereof is output. Therefore, adjustment the combustion control system can be facilitated, the breakage of facilities can be avoided, the utilization ratio of facilities can be enhanced, and safety can also be enhanced.

According to the combustion vibration estimating apparatus of the present invention, the internal pressure variation characteristic grasping unit makes the internal pressure variation of the combustor into the mathematical model from the plant data and weather data input by the inputting unit, the NOx discharge amount characteristic grasping unit makes the NOx discharge amount into the mathematical model from the plant data and weather data input by the inputting unit, the CO discharge amount characteristic grasping unit makes the CO discharge amount into the mathematical model from the plant data and weather data input by the inputting unit, the safe region estimating unit applies the limiting value of the internal pressure variation and the restricting values of NOx and CO to the mathematical model, and the region where the discharge amounts of NOx and CO are equal to or less than the restricting value and the combustion vibration is prone to be generated, and the safe region estimation result is output from the outputting unit. Therefore, adjustment the combustion control system can be facilitated, the breakage of facilities can be avoided, the utilization ratio of facilities can be enhanced, and safety can also be enhanced.

According to the combustion vibration estimating apparatus of the present invention, the internal pressure variation characteristic grasping unit is input by the inputting unit, the internal pressure variation of the combustor is made into the mathematical model from the plant data and weather data selected by the focus setting unit, the discharge amount characteristic grasping unit makes the discharge amounts of NOx and CO into the mathematical model from the plant data and weather data selected by the focus setting unit, the safe region estimating unit applies the limiting value of the internal pressure variation and restricting values of NOx and CO to the mathematical model, a region where the NOx discharge amount and the CO discharge amount are equal to or less than the restricting value and the combustion vibration is less prone to be generated is obtained, and the safe region estimation result is output from the outputting unit. Therefore, adjustment the combustion control system can be facilitated, the breakage of facilities can be avoided, the utilization ratio of facilities can be enhanced, and safety can also be enhanced.

Moreover, focus setting unit selects plant data and weather data input by the inputting unit based on the region designated by the inputting unit or the setting mode. Therefore, the safe region where the combustion vibration is less prone to be generated can widely be obtained macroscopically and can be obtained with high precision macroscopically.

According to the combustion vibration estimating apparatus of the present invention, the internal pressure variation characteristic grasping unit makes the internal pressure variation of the combustor into the mathematical model from the plant data and weather data selected by the focus determining unit, the discharge amount characteristic grasping unit makes the NOx and CO discharge amounts into the mathematical model from the plant data and weather data selected by the focus determining unit, the safe region estimating unit applies the limiting value of the internal pressure variation and the NOx and CO restricting values to the mathematical model, a region where the NOx discharge amount and the CO discharge amount are equal to or less than the restricting value and the combustion vibration is less prone to be generated is obtained, and the proposed adjustment generating unit obtains the point to be measured next using the safe region estimation result by the safe region estimating unit, and the safe region estimation result by the safe region estimating unit and the point to be measured next by the proposed adjustment generating unit are output from the outputting unit. Therefore, adjustment the combustion control system can be facilitated, the breakage of facilities can be avoided, the utilization ratio of facilities can be enhanced, and safety can also be enhanced.

Moreover, the focus determining unit determines the next focus based on the mathematical model obtained based on the plant data and weather data selected by the determination of the last focus. Therefore, it is easy to search the optimal driving point.

According to the plant of the present invention, the combustion vibration-prone to be generated region and the combustion vibration-less prone to be generated region are obtained based on the mathematical model constructed from the plant data and weather data, and a result thereof is output. Therefore, adjustment the combustion control system can be facilitated, the breakage of facilities can be avoided, the utilization ratio of facilities can be enhanced, and safety can also be enhanced.

According to the plant of the present invention, the internal pressure variation characteristic grasping unit makes the internal pressure variation of the combustor into the mathematical model from the plant data and weather data input by the inputting unit, the combustion vibration region estimating unit applies the limiting value of the internal pressure variation to the mathematical model to obtain the combustion-prone to be generated region, and the combustion vibration region estimation result is output from the outputting unit. Therefore, adjustment the combustion control system can be facilitated, the breakage of facilities can be avoided, the utilization ratio of facilities can be enhanced, and safety can also be enhanced.

Moreover, the plant data and the weather data input by the inputting unit are stored into a time series, the internal pressure variation characteristic grasping unit obtains data from the database to make the internal pressure variation of the combustor into the mathematical model. Therefore, a region where the combustion vibration is prone to be generated is obtained more reliably.

According to the plant of the present invention, the internal pressure variation estimating unit estimates the internal pressure variation of the combustor by the plant data and weather data input by the inputting unit, and the estimated internal pressure variation estimation result is output from the outputting unit. Therefore, it is possible to judge whether the internal pressure variation of the gas turbine combustor is at a level as planned, generation of the combustion vibration can be detected at an early stage, the breakage of facilities can be avoided, the utilization ratio of facilities can be enhanced, and safety can also be enhanced.

Moreover, the plant data and weather data input by the inputting unit are stored in the time series, the internal pressure variation estimating unit estimates the estimated value of the internal pressure variation of the latest data stored in the database. Therefore, the internal pressure variation is estimated reliably.

According to the plant of the present invention, the combustion vibration-less prone to be generated region and combustion vibration-prone to be generated region are obtained based on the mathematical model which explains internal pressure variation and NOx discharge amount constructed from the plant data and weather data. Therefore, adjustment the combustion control system can be facilitated, the breakage of facilities can be avoided, the utilization ratio of facilities can be enhanced, and safety can also be enhanced.

According to the plant of the present invention, the internal pressure variation characteristic grasping unit makes the internal pressure variation of the combustor into the mathematical model from the plant data and weather data input from the inputting unit, the NOx discharge amount characteristic grasping unit makes the NOx discharge amount into the mathematical model from the plant data and weather data input by the inputting unit, the safe region estimating unit applies the limiting value of the internal pressure variation and the restricting value of the NOx to the mathematical model to obtain the combustion vibration-less prone to be generated region, and the safe region estimation result is output from the outputting unit. Therefore, adjustment the combustion control system can be facilitated, the breakage of facilities can be avoided, the utilization ratio of facilities can be enhanced, and safety can also be enhanced.

According to the plant of the present invention, the combustion vibration-less prone to be generated region and combustion vibration-prone to be generated region are obtained based on the mathematical model which explains the internal pressure variation, NOx discharge amount and the CO discharge amount constructed from the plant data and weather data, and a result thereof is output. Therefore, adjustment the combustion control system can be facilitated, the breakage of facilities can be avoided, the utilization ratio of facilities can be enhanced, and safety can also be enhanced.

According to the plant of the present invention, the internal pressure variation characteristic grasping unit makes the internal pressure variation of the combustor into the mathematical model from the plant data and weather data input by the inputting unit, the NOx discharge amount characteristic grasping unit makes the NOx discharge amount into the mathematical model from the plant data and weather data input by the inputting unit, the CO discharge amount characteristic grasping unit makes the CO discharge amount into the mathematical model from the plant data and weather data input by the inputting unit, the safe region estimating unit applies the limiting value of the internal pressure variation and the restricting values of NOx and CO to the mathematical model, and the region where the discharge amounts of NOx and CO are equal to or less than the restricting value and the combustion vibration is prone to be generated, and the safe region estimation result is output from the outputting unit. Therefore, adjustment the combustion control system can be facilitated, the breakage of facilities can be avoided, the utilization ratio of facilities can be enhanced, and safety can also be enhanced.

According to the plant of the present invention, the internal pressure variation characteristic grasping unit is input by the inputting unit, the internal pressure variation of the combustor is made into the mathematical model from the plant data and weather data selected by the focus setting unit, the discharge amount characteristic grasping unit makes the discharge amounts of NOx and CO into the mathematical model from the plant data and weather data selected by the focus setting unit, the safe region estimating unit applies the limiting value of the internal pressure variation and restricting values of NOx and CO to the mathematical model, a region where the NOx discharge amount and the CO discharge amount are equal to or less than the restricting value and the combustion vibration is less prone to be generated is obtained, and the safe region estimation result is output from the outputting unit. Therefore, adjustment the combustion control system can be facilitated, the breakage of facilities can be avoided, the utilization ratio of facilities can be enhanced, and safety can also be enhanced.

Moreover, the focus setting unit selects plant data and weather data input by the inputting unit based on the region designated by the inputting unit or the setting mode. Therefore, the safe region where the combustion vibration is less prone to be generated can widely be obtained macroscopically and can be obtained with high precision macroscopically.

According to the plant of the present invention, the internal pressure variation characteristic grasping unit makes the internal pressure variation of the combustor into the mathematical model from the plant data and weather data selected by the focus determining unit, the discharge amount characteristic grasping unit makes the NOx and CO discharge amounts into the mathematical model from the plant data and weather data selected by the focus determining unit, the safe region estimating unit applies the limiting value of the internal pressure variation and the NOx and CO restricting values to the mathematical model, a region where the NOx discharge amount and the CO discharge amount are equal to or less than the restricting value and the combustion vibration is less prone to be generated is obtained, and the proposed adjustment generating unit obtains the point to be measured next using the safe region estimation result by the safe region estimating unit, and the safe region estimation result by the safe region estimating unit and the point to be measured next by the proposed adjustment generating unit are output from the outputting unit. Therefore, adjustment the combustion control system can be facilitated, the breakage of facilities can be avoided, the utilization ratio of facilities can be enhanced, and safety can also be enhanced.

Moreover, the focus determining unit determines the next focus based on the mathematical model obtained based on the plant data and weather data selected by the determination of the last focus. Therefore, it is easy to search the optimal driving point.

According to the gas turbine plant of the present invention, the combustion vibration-prone to be generated region and the combustion vibration-less prone to be generated region are obtained based on the mathematical model constructed from the plant data and weather data, and a result thereof is output. Therefore, adjustment the combustion control system can be facilitated, the breakage of facilities can be avoided, the utilization ratio of facilities can be enhanced, and safety can also be enhanced.

According to the gas turbine plant of the present invention, the internal pressure variation characteristic grasping unit makes the internal pressure variation of the combustor into the mathematical model from the plant data and weather data input by the inputting unit, the combustion vibration region estimating unit applies the limiting value of the internal pressure variation to the mathematical model to obtain the combustion-prone to be generated region, and the combustion vibration region estimation result is output from the outputting unit. Therefore, adjustment the combustion control system can be facilitated, the breakage of facilities can be avoided, the utilization ratio of facilities can be enhanced, and safety can also be enhanced.

Moreover, the plant data and the weather data input by the inputting unit are stored into a time series, the internal pressure variation characteristic grasping unit obtains data from the database to make the internal pressure variation of the combustor into the mathematical model. Therefore, a region where the combustion vibration is prone to be generated is obtained more reliably.

According to the gas turbine plant of the present invention, the internal pressure variation estimating unit estimates the internal pressure variation of the combustor by the plant data and weather data input by the inputting unit, and the estimated internal pressure variation estimation result is output from the outputting unit. Therefore, it is possible to judge whether the internal pressure variation of the gas turbine combustor is at a level as planned, generation of the combustion vibration can be detected at an early stage, the breakage of facilities can be avoided, the utilization ratio of facilities can be enhanced, and safety can also be enhanced.

Moreover, the plant data and weather data input by the inputting unit are stored in the time series, the internal pressure variation estimating unit estimates the estimated value of the internal pressure variation of the latest data stored in the database. Therefore, the internal pressure variation is estimated reliably.

According to the gas turbine plant of the present invention, the combustion vibration-less prone to be generated region and combustion vibration-prone to be generated region are obtained based on the mathematical model which explains internal pressure variation and NOx discharge amount constructed from the plant data and weather data. Therefore, adjustment the combustion control system can be facilitated, the breakage of facilities can be avoided, the utilization ratio of facilities can be enhanced, and safety can also be enhanced.

According to the gas turbine plant of the present invention, the internal pressure variation characteristic grasping unit makes the internal pressure variation of the combustor into the mathematical model from the plant data and weather data input from the inputting unit, the NOx discharge amount characteristic grasping unit makes the NOx discharge amount into the mathematical model from the plant data and weather data input by the inputting unit, the safe region estimating unit applies the limiting value of the internal pressure variation and the restricting value of the NOx to the mathematical model to obtain the combustion vibration-less prone to be generated region, and the safe region estimation result is output from the outputting unit. Therefore, adjustment the combustion control system can be facilitated, the breakage of facilities can be avoided, the utilization ratio of facilities can be enhanced, and safety can also be enhanced.

According to the gas turbine plant of the present invention, the combustion vibration-less prone to be generated region and combustion vibration-prone to be generated region are obtained based on the mathematical model which explains the internal pressure variation, NOx discharge amount and the CO discharge amount constructed from the plant data and weather data, and a result thereof is output. Therefore, adjustment the combustion control system can be facilitated, the breakage of facilities can be avoided, the utilization ratio of facilities can be enhanced, and safety can also be enhanced.

According to the gas turbine plant of the present invention, the internal pressure variation characteristic grasping unit makes the internal pressure variation of the combustor into the mathematical model from the plant data and weather data input by the inputting unit, the NOx discharge amount characteristic grasping unit makes the NOx discharge amount into the mathematical model from the plant data and weather data input by the inputting unit, the CO discharge amount characteristic grasping unit makes the CO discharge amount into the mathematical model from the plant data and weather data input by the inputting unit, the safe region estimating unit applies the limiting value of the internal pressure variation and the restricting values of NOx and CO to the mathematical model, and the region where the discharge amounts of NOx and CO are equal to or less than the restricting value and the combustion vibration is prone to be generated, and the safe region estimation result is output from the outputting unit. Therefore, adjustment the combustion control system can be facilitated, the breakage of facilities can be avoided, the utilization ratio of facilities can be enhanced, and safety can also be enhanced.

According to the gas turbine plant of the present invention, the internal pressure variation characteristic grasping unit is input by the inputting unit, the internal pressure variation of the combustor is made into the mathematical model from the plant data and weather data selected by the focus setting unit, the discharge amount characteristic grasping unit makes the discharge amounts of NOx and CO into the mathematical model from the plant data and weather data selected by the focus setting unit, the safe region estimating unit applies the limiting value of the internal pressure variation and restricting values of NOx and CO to the mathematical model, a region where the NOx discharge amount and the CO discharge amount are equal to or less than the restricting value and the combustion vibration is less prone to be generated is obtained, and the safe region estimation result is output from the outputting unit. Therefore, adjustment the combustion control system can be facilitated, the breakage of facilities can be avoided, the utilization ratio of facilities can be enhanced, and safety can also be enhanced.

Moreover, the focus setting unit selects plant data and weather data input by the inputting unit based on the region designated by the inputting unit or the setting mode. Therefore, the safe region where the combustion vibration is less prone to be generated can widely be obtained macroscopically and can be obtained with high precision macroscopically.

According to the gas turbine plant of the present invention, the internal pressure variation characteristic grasping unit makes the internal pressure variation of the combustor into the mathematical model from the plant data and weather data selected by the focus determining unit, the discharge amount characteristic grasping unit makes the NOx and CO discharge amounts into the mathematical model from the plant data and weather data selected by the focus determining unit, the safe region estimating unit applies the limiting value of the internal pressure variation and the NOx and CO restricting values to the mathematical model, a region where the NOx discharge amount and the CO discharge amount are equal to or less than the restricting value and the combustion vibration is less prone to be generated is obtained, and the proposed adjustment generating unit obtains the point to be measured next using the safe region estimation result by the safe region estimating unit, and the safe region estimation result by the safe region estimating unit and the point to be measured next by the proposed adjustment generating unit are output from the outputting unit. Therefore, adjustment the combustion control system can be facilitated, the breakage of facilities can be avoided, the utilization ratio of facilities can be enhanced, and safety can also be enhanced.

Moreover, the focus determining unit determines the next focus based on the mathematical model obtained based on the plant data and weather data selected by the determination of the last focus. Therefore, it is easy to search the optimal driving point.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A combustion vibration estimating apparatus that estimates possibility of combustion vibration to occur using data at present, and that outputs a result estimated thereby for controlling a combustor not to cause the combustion vibration, the combustion vibration estimating apparatus comprising:

a combustion vibration region estimating unit that estimates possibility of combustion vibration to occur using a mathematical model; and an outputting unit which outputs an estimation result by the combustion vibration region estimating unit, wherein the mathematical model representing internal pressure variation employs plant data and weather data as variables, and the combustion vibration region estimating unit estimates a possible combustion vibration-prone region and a possible combustion vibration-less prone region based on the mathematical model, and outputs the estimated results to the outputting unit.

2. A combustion vibration estimating apparatus that estimates possibility of combustion vibration to occur using data at present, and that outputs a result estimated thereby for controlling a combustor not to cause the combustion vibration, the combustion vibration estimating apparatus comprising:

an inputting unit which inputs plant data, weather data and limiting value of internal pressure variation, an internal pressure variation characteristic grasping unit which sets up a mathematical model representing internal pressure variation of a combustor using the inputted plant data and weather data as variables, a combustion vibration region estimating unit that estimates possibility of combustion vibration to occur using the mathematical model by applying the limiting value of the internal pressure variation to the mathematical model to estimate a possible combustion vibration-prone region; and an outputting unit which outputs the possible combustion vibration-prone region estimated by the combustion vibration region estimating unit.

3. The combustion vibration estimating apparatus according to claim 2, further comprising:

a database which stores the plant data and the weather data inputted by the inputting unit into a time series, wherein the internal pressure variation characteristic grasping unit obtains data from the database to set up a mathematical model representing the internal pressure variation of the combustor.

4. A combustion vibration estimating apparatus that estimates possibility of combustion vibration to occur using data at present, and that outputs a result estimated thereby for controlling a combustor not to cause the combustion vibration, the combustion vibration estimating apparatus comprising:

an inputting unit which inputs plant data and weather data, an internal pressure variation estimating unit which estimates internal pressure variation of a combustor from the plant data and weather data; and an outputting unit which outputs internal pressure variation estimation result estimated by the internal pressure variation estimating unit.

5. The combustion vibration estimating apparatus according to claim 4, further comprising a database which stores the plant data and weather data inputted by the inputting unit, wherein the internal pressure variation estimating unit estimates estimated value of the internal pressure variation by data of latest time stored in the database.

6. A combustion vibration estimating apparatus wherein a mathematical model for explaining internal pressure variation and NOx discharge amount is constructed from plant data and weather data, a combustion vibration-prone to be generated region and a combustion vibration-less prone to be generated region are obtained based on the constructed mathematical model and are output.

7. A combustion vibration estimating apparatus comprising:

an inputting unit which inputs limiting values of plant data, weather data and internal pressure variation, as well as a restricting value of NOx, an internal pressure variation characteristic grasping unit which makes internal pressure variation of a combustor into a mathematical model from the input plant data and weather data, a NOx discharge amount characteristic grasping unit which makes an NOx discharge amount into a mathematical model from the input plant data and weather data, a safe region estimating unit which applies a limiting value of the internal pressure variation to the mathematical model obtained by the internal pressure variation characteristic grasping unit, and applies a restricting value of the NOx to the mathematical model obtained by the NOx discharge amount characteristic grasping unit, thereby obtaining a region where the NOx discharge amount is equal to or less than the restricting value and the combustion vibration is less prone to be generated, and an outputting unit which outputs a safe region estimation result by the safe region estimating unit.

8. A combustion vibration estimating apparatus wherein a mathematical model for explaining internal pressure variation, NOx and a CO discharge amount is constructed from plant data and weather data, a combustion vibration-prone to be generated region and a combustion vibration-less prone to be generated region are obtained based on the constructed mathematical model and are output.

9. A combustion vibration estimating apparatus comprising:

an inputting unit which inputs limiting values of plant data, weather data and internal pressure variation, as well as restricting values of NOx and CO, an internal pressure variation characteristic grasping unit which makes internal pressure variation of a combustor into a mathematical model from the input plant data and weather data, a NOx discharge amount characteristic grasping unit which makes an NOx discharge amount into a mathematical model from the input plant data and weather data, a CO discharge amount characteristic grasping unit which makes an CO discharge amount into a mathematical model from the input plant data and weather data, a safe region estimating unit which applies a limiting value of the internal pressure variation to the mathematical model obtained by the internal pressure variation characteristic grasping unit, applies a restricting value of the NOx to the mathematical model obtained by the NOx discharge amount characteristic grasping unit, and applies a restricting value of the CO to the mathematical model obtained by the CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

10. A combustion vibration estimating apparatus comprising:

an inputting unit which inputs limiting values of plant data, weather data and internal pressure variation, as well as restricting values of NOx and CO, a focus setting unit which selects data used for making a mathematical model from the input plant data and weather data, an internal pressure variation characteristic grasping unit which makes internal pressure variation of a combustor into a mathematical model from the selected plant data and weather data, a discharge amount characteristic grasping unit which makes NOx and CO discharge amounts into a mathematical model from the selected plant data and weather data, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

11. The combustion vibration estimating apparatus according to claim 10, wherein the focus setting unit selects the plant data and weather data input from the inputting unit based on a region or a setting mode designated by the inputting unit.

12. A combustion vibration estimating apparatus comprising:

an inputting unit which inputs limiting values of plant data, weather data and internal pressure variation, as well as restricting values of NOx and CO.

a focus setting unit which selects data used for making a mathematical model from the input plant data and weather data, an internal pressure variation characteristic grasping unit which makes internal pressure variation of a combustor into a mathematical model from the selected plant data and weather data, a discharge amount characteristic grasping unit which makes NOx and CO discharge amounts into a mathematical model from the selected plant data and weather data, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, a proposed adjustment generating unit which obtains a point to be measured next, using a safe region estimation result by the safe region estimating unit, and an outputting unit which outputs a safe region estimation result by the safe region estimating unit and a point to be measured by the proposed adjustment generating unit.

13. The combustion vibration estimating apparatus according to claim 12, wherein the focus determining unit determines a next focus based on the mathematical model obtained based on plant data and weather data selected by determination of a last focus.

14. A plant comprising:
a combustor, and
a combustion vibration estimating apparatus that estimates possibility of combustion vibration to occur using data at present, and that outputs a result estimated thereby for controlling a combustor not to cause the combustion vibration, the combustion vibration estimating apparatus using a mathematical model which represents internal pressure variation using plant data and weather data as variables, and estimating and outputting a possible combustion vibration-prone region and a possible combustion vibration-less prone region based on the mathematical model.

15. A plant comprising:
a combustor, and
a combustion vibration estimating apparatus that estimates possibility of combustion vibration to occur using data at present, and that outputs a result estimated thereby for controlling a combustor not to cause the combustion vibration, the combustion vibration estimating apparatus including:

an inputting unit which inputs plant data, weather data and limiting values of internal pressure variation obtained with combustion in the combustor;

an internal pressure variation characteristic grasping unit which sets up a mathematical model representing internal pressure variation of a combustor using the plant data and weather data inputted as variables;

a combustion vibration region estimating unit that estimates possibility of combustion vibration to occur using the mathematical model by applying the limiting value of the internal pressure variation to the mathematical model to estimate a possible combustion vibration-prone region; and an outputting unit which outputs the possible combustion vibration-prone region estimated by the combustion vibration region estimating unit.

16. The plant according to claim 15, wherein the combustion vibration estimating apparatus further comprising:

a database which stores the plant data and the weather data inputted by the inputting unit into a time series, wherein the internal pressure variation characteristic grasping unit obtains data from the database to set up a mathematical model representing the internal pressure variation of the combustor.

17. A plant comprising:
a combustor; and
a combustion vibration estimating apparatus that estimates possibility of combustion vibration to occur using data at present, and that outputs a result estimated thereby for controlling a combustor not to cause the combustion vibration, the combustion vibration estimating apparatus including:

an inputting unit which inputs plant data and weather data;

an internal pressure variation estimating unit which estimates internal pressure variation of the combustor from the plant data and weather data which are inputted from the inputting unit; and an outputting unit which outputs internal pressure variation estimation result estimated by the internal pressure variation estimating unit.

18. The plant according to claim 17, wherein the combustion vibration estimating apparatus further comprises a database which stores the plant data and weather data inputted by the inputting unit, wherein the internal pressure variation estimating unit estimates the estimated value of the internal pressure variation by data of latest time stored in the database.

19. A plant comprising:
   a combustor, and
   a combustion vibration estimating apparatus which constructs a mathematical model which explains internal pressure variation and an NOx discharge amount from plant data and weather data which are obtained with combustion in the combustor, and obtains and outputs a combustion vibration-prone to be generated region and a combustion vibration-less prone to be generated region based on the constructed mathematical model.

20. A plant comprising:
   a combustor, and
   a combustion vibration estimating apparatus having an inputting unit which inputs limiting values of plant data, weather data obtained with combustion in the combustor and internal pressure variation, as well as a restricting value of NOx, an internal pressure variation characteristic grasping unit which makes internal pressure variation of a combustor into a mathematical model from the plant data and weather data input from the inputting unit, a NOx discharge amount characteristic grasping unit which makes an NOx discharge amount into a mathematical model from the input plant data and weather data input from the inputting unit, a safe region estimating unit which applies a limiting value of the internal pressure variation to the mathematical model obtained by the internal pressure variation characteristic grasping unit, and applies a restricting value of the NOx to the mathematical model obtained by the NOx discharge amount characteristic grasping unit, thereby obtaining a region where the NOx discharge amount is equal to or less than the restricting value and the combustion vibration is less prone to be generated, and an outputting unit which outputs a safe region estimation result by the safe region estimating unit.

21. A plant comprising:
   a combustor, and
   a combustion vibration estimating apparatus which constructs a mathematical model for explaining internal pressure variation, NOx and a CO discharge amount from plant data and weather data obtained with combustion in the combustor, a combustion vibration-prone to be generated region and a combustion vibration-less prone to be generated region are obtained based on the constructed mathematical model and are output.

22. A plant comprising:
   a combustor, and
   a combustion vibration estimating apparatus having an inputting unit which inputs limiting values of plant data, weather data obtained with combustion in the combustor and internal pressure variation, as well as restricting values of NOx and CO, an internal pressure variation characteristic grasping unit which makes internal pressure variation of a combustor into a mathematical model from the plant data and weather data input by the inputting unit, a NOx discharge amount characteristic grasping unit which makes an NOx discharge amount into a mathematical model from the plant data and weather data input by the inputting unit, a CO discharge amount characteristic grasping unit which makes an CO discharge amount into a mathematical model from the plant data and weather data input by the inputting unit, a safe region estimating unit which applies a limiting value of the internal pressure variation to the mathematical model obtained by the internal pressure variation characteristic grasping unit, applies a restricting value of the NOx to the mathematical model obtained by the NOx discharge amount characteristic grasping unit, and applies a restricting value of the CO to the mathematical model obtained by the CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

23. A plant comprising:
   a combustor, and
   a combustion vibration estimating apparatus having inputting unit which inputs limiting values of plant data, weather data obtained with combustion in the combustor and internal pressure variation, as well as restricting values of NOx and CO, a focus setting unit which selects data used for making a mathematical model from the plant data and weather data input by the inputting unit, an internal pressure variation characteristic grasping unit which makes internal pressure variation of a combustor into a mathematical model from the plant data and weather data selected by the focus setting unit, a discharge amount characteristic grasping unit which makes NOx and CO discharge amounts into a mathematical model from the plant data and weather data selected by the focus setting unit, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

24. The plant according to claim 23, wherein the focus setting unit selects the plant data and weather data input from the inputting unit based on a region or a setting mode designated by the inputting unit.

25. A plant comprising:
   a combustor, and
   a combustion vibration estimating apparatus having an inputting unit which inputs limiting values of plant data, weather data obtained with combustion in the combustor and internal pressure variation, as well as restricting values of NOx and CO, a focus setting unit which selects data used for making a mathematical model from the plant data and weather data input by the inputting unit, an internal pressure variation characteristic grasping unit which makes internal pressure variation of a combustor into a mathematical model from the plant data and weather data selected by the focus setting unit, a discharge amount characteristic grasping unit which makes NOx and CO discharge amounts into a mathematical model from the plant data and weather data selected by the focus setting unit, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, a proposed adjustment generating unit which obtains a point to be measured next, using a safe region estimation result by the safe region estimating unit, and an outputting unit which outputs a safe region estimation result by the safe region estimating unit and a point to be measured by the proposed adjustment generating unit.

26. The plant according to claim 25, wherein the focus determining unit determines a next focus based on the mathematical model obtained based on plant data and weather data selected by determination of a last focus.

27. A gas turbine plant comprising:
a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor bypassing the combustor, and
a combustion vibration estimating apparatus that estimates possibility of combustion vibration to occur using a mathematical model representing internal pressure variation employing plant data and weather data as variables, and estimates and outputs a possible combustion vibration-prone region and a possible combustion vibration-less prone region based on the mathematical model.

28. A gas turbine plant comprising:
a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor; and
a combustion vibration estimating apparatus that estimates possibility of combustion vibration to occur using data at present, and that outputs a result estimated thereby for controlling a combustor not to cause the combustion vibration, the combustion vibration estimating apparatus comprising:
an inputting unit which inputs plant data, weather data and limiting value of internal pressure variation obtained with combustion in the combustor;
an internal pressure variation characteristic grasping unit which sets up a mathematical model representing internal pressure variation of a combustor using the inputted plant data and weather data as variables;
a combustion vibration region estimating unit that estimates possibility of combustion vibration to occur using the mathematical model by applying the limiting value of the internal pressure variation to the mathematical model to estimate a possible combustion vibration-prone region; and
an outputting unit which outputs the possible combustion vibration-prone region estimated by the combustion vibration region estimating unit.

29. The gas turbine plant according to claim 28, wherein the combustion vibration estimating apparatus further comprises a database which stores the plant data and the weather data inputted by the inputting unit into a time series, wherein the internal pressure variation characteristic grasping unit obtains data from the database to set up a mathematical model representing the internal pressure variation of the combustor.

30. A gas turbine plant comprising:
a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor; and
a combustion vibration estimating apparatus that estimates possibility of combustion vibration to occur using data at present, and that outputs a result estimated thereby for controlling a combustor not to cause the combustion vibration, the combustion vibration estimating apparatus comprising:
an inputting unit which inputs plant data and weather data;
an internal pressure variation estimating unit which estimates internal pressure variation of the combustor from the plant data and weather data which are input from the inputting unit; and
an outputting unit which outputs internal pressure variation estimation result estimated by the internal pressure variation estimating unit.

31. The gas turbine plant according to claim 30, wherein the combustion vibration estimating apparatus further comprises a database which stores in the time series the plant data and weather data inputted by the inputting unit, wherein the internal pressure variation estimating unit estimates the estimated value of the internal pressure variation by data of latest time stored in the database.

32. A gas turbine plant comprising:
a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus which constructs a mathematical model which explains internal pressure variation and an NOx discharge amount from plant data and weather data which are obtained with combustion in the combustor, and obtains and outputs a combustion vibration-prone to be generated region and a combustion vibration-less prone to be generated region based on the constructed mathematical model.

33. A gas turbine plant comprising:

a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus having an inputting unit which inputs limiting values of plant data, weather data obtained with combustion in the combustor and internal pressure variation, as well as a restricting value of NOx, an internal pressure variation characteristic grasping unit which makes internal pressure variation of a combustor into a mathematical model from the plant data and weather data input from the inputting unit, a NOx discharge amount characteristic grasping unit which makes an NOx discharge amount into a mathematical model from the input plant data and weather data input from the inputting unit, a safe region estimating unit which applies a limiting value of the internal pressure variation to the mathematical model obtained by the internal pressure variation characteristic grasping unit, and applies a restricting value of the NOx to the mathematical model obtained by the NOx discharge amount characteristic grasping unit, thereby obtaining a region where the NOx discharge amount is equal to or less than the restricting value and the combustion vibration is less prone to be generated, and an outputting unit which outputs a safe region estimation result by the safe region estimating unit.

34. A gas turbine plant comprising:

a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus which constructs a mathematical model for explaining internal pressure variation, NOx and a CO discharge amount from plant data and weather data obtained with combustion in the combustor, a combustion vibration-prone to be generated region and a combustion vibration-less prone to be generated region are obtained based on the constructed mathematical model and are output.

35. A gas turbine plant comprising:

a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus having an inputting unit which inputs limiting values of plant data, weather data obtained with combustion in the combustor and internal pressure variation, as well as restricting values of NOx and CO, an internal pressure variation characteristic grasping unit which makes internal pressure variation of a combustor into a mathematical model from the plant data and weather data input by the inputting unit, a NOx discharge amount characteristic grasping unit which makes an NOx discharge amount into a mathematical model from the plant data and weather data input by the inputting unit, a CO discharge amount characteristic grasping unit which makes an CO discharge amount into a mathematical model from the plant data and weather data input by the inputting unit, a safe region estimating unit which applies a limiting value of the internal pressure variation to the mathematical model obtained by the internal pressure variation characteristic grasping unit, applies a restricting value of the NOx to the mathematical model obtained by the NOx discharge amount characteristic grasping unit, and applies a restricting value of the CO to the mathematical model obtained by the CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

36. A gas turbine plant comprising:

a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus having an inputting unit which inputs limiting values of plant data, weather data obtained with combustion in the combustor and internal pressure variation, as well as restricting values of NOx and CO, a focus setting unit which selects data used for making a mathematical model from the plant data and weather data input by the inputting unit, an internal pressure variation characteristic grasping unit which makes internal pressure variation of a combustor into a mathematical model from the plant data and weather data selected by the focus setting unit, a discharge amount characteristic grasping unit which makes NOx and CO discharge amounts into a mathematical model from the plant data and weather data selected by the focus setting unit, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, and an outputting unit which outputs a safe region estimation result by the safe region estimating unit.

37. The gas turbine plant according to claim 36, wherein the focus setting unit selects the plant data and weather data input from the inputting unit based on a region or a setting mode designated by the inputting unit.

38. A gas turbine plant comprising:

a gas turbine having a combustor, a compressor for supplying compressed air to the combustor, an inlet guide blade for supplying air to the compressor, a turbine which is connected to the compressor and is rotated by emission gas of the combustor, a main fuel flow rate control valve for controlling a main flame fuel supply amount which is main flame of combustion in the combustor, a pilot fuel flow rate control valve for controlling a pilot flame fuel supply amount which holds the main flame, and a combustor bypass valve for supplying, to the turbine, the compressed air supplied from the compressor without through the combustor, and a combustion vibration estimating apparatus having an inputting unit which inputs limiting values of plant data, weather data obtained with combustion in the combustor and internal pressure variation, as well as restricting values of NOx and CO, a focus setting unit which selects data used for making a mathematical model from the plant data and weather data input by the inputting unit, an internal pressure variation characteristic grasping unit which makes internal pressure variation of a combustor into a mathematical model from the plant data and weather data selected by the focus setting unit, a discharge amount characteristic grasping unit which makes NOx and CO discharge amounts into a mathematical model from the plant data and weather data selected by the focus setting unit, a safe region estimating unit which applies a limiting value of the internal pressure variation to the mathematical model obtained by the internal pressure variation characteristic grasping unit, applies restricting values of the NOx and CO to the mathematical models obtained by the NOx and CO discharge amount characteristic grasping unit, thereby obtaining a region where the NOx discharge amount and the CO discharge amount are equal to or less than the restricting value and the combustion vibration is less prone to be generated, a proposed adjustment generating unit which obtains a point to be measured next, using a safe region estimation result by the safe region estimating unit, and an outputting unit which outputs a safe region estimation result by the safe region estimating unit and a point to be measured by the proposed adjustment generating unit.

39. The gas turbine plant according to claim 38, wherein the focus determining unit determines a next focus based on the mathematical model obtained based on plant data and weather data selected by determination of a last focus.

* * * * *